(12) United States Patent
Kuhara

(10) Patent No.: US 6,882,763 B2
(45) Date of Patent: Apr. 19, 2005

US006882763B2

(54) MULTICHANNEL OPTICAL COMMUNICATIONS MODULE

(75) Inventor: Yoshiki Kuhara, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 90 days.

(21) Appl. No.: 10/383,137

(22) Filed: Mar. 6, 2003

(65) Prior Publication Data
US 2003/0190124 A1 Oct. 9, 2003

(30) Foreign Application Priority Data
Apr. 3, 2002 (JP) ........................ 2002-100931

(51) Int. Cl.[7] .................. G02B 6/12; G02B 6/36
(52) U.S. Cl. .................. 385/14; 385/88; 385/92
(58) Field of Search .................. 385/14, 15, 24, 385/88–92

(56) References Cited

U.S. PATENT DOCUMENTS

| | | | | |
|---|---|---|---|---|
| 5,802,222 A | * | 9/1998 | Rasch et al. | 385/1 |
| 6,212,319 B1 | * | 4/2001 | Cayrefourcq | 385/40 |
| 6,220,764 B1 | * | 4/2001 | Kato et al. | 385/92 |
| 6,316,281 B1 | * | 11/2001 | Lee et al. | 438/31 |
| 6,324,314 B1 | * | 11/2001 | Ukechi et al. | 385/14 |
| 6,361,222 B1 | * | 3/2002 | Kawaguchi et al. | 385/88 |
| 6,480,639 B1 | * | 11/2002 | Hashimoto et al. | 385/14 |
| 6,495,382 B1 | * | 12/2002 | Yap | 438/24 |

FOREIGN PATENT DOCUMENTS

JP  11-68705  3/1999

OTHER PUBLICATIONS

M. Shishijura, K. Nagatsuma, T. Ido, m. Tokuda, K. Nakahara, E. Nomoto, T. Sudoh & H. Sano, "10Gbps x4–channel parallel LD module", Proceeding of the 2001 Communications Society Conference of IEICE, C–3–50, p. 160 (2001).

* cited by examiner

Primary Examiner—John R. Lee
Assistant Examiner—Paul M. Gurzo
(74) Attorney, Agent, or Firm—Fish & Richardson P.C.

(57) ABSTRACT

250 $\mu$m is the standardized pitch H of the prevalent multichannel ribbonfibers. Current laser diodes and photodiodes have a size larger than 300 $\mu$m. Curving lightpaths made on a silicon bench for reconciling the chip size with current ribbonfibers causes bending power loss, optical crosstalk and difficulty of production. Linear parallel lightpaths with a width d for more than one chip site are produced on a bench with a pitch E which is equal to the pitch H of the multichannels. Optoelectronic device chips with a width W satisfying an inequality E<W<2E−d are mounted on the lightpaths at spots which are different from neighboring chips in the longitudinal direction.

8 Claims, 17 Drawing Sheets

Embodiment 1

Embodiment 1

Embodiment 1

Embodiment 1

Embodiment 2

Embodiment 2

Embodiment 2

Embodiment 5

Embodiment 5

Embodiment 5

Embodiment 6

Embodiment 6

Embodiment 7

Embodiment 7

Embodiment 8

Embodiment 8

Embodiment 9 polarizer

Embodiment 10

Embodiment 10 rod lens

Embodiment 11

Embodiment 11

Embodiment 11

Embodiment 12

Embodiment 12

Embodiment 4

MULTICHANNEL OPTICAL COMMUNICATIONS MODULE

BACKGROUND OF THE INVENTION

1. Field of the Invention

This invention relates to a parallel multichannel optical communications module which transmits a plurality of signals via an optical fiber having a plurality of element fibers. The optical communications module is a concept including a laser diode module, a photodiode module, a modulator module, a demodulator module or an in-line monitor.

This invention claims the priority of Japanese Patent Application No. 2002-100931 filed on Apr. 3, 2002, which is incorporated herein by reference.

2. Description of Related Art

Planar lightguide type (PLC; planar lightguide circuit) modules having a plurality of lightpaths and optoelectronic device chips (LDs or PDs) are promising modules for coping with forthcoming multichannel optical communications which bring four signals, eight signals or sixteen signals simultaneously via four channels, eight channels or sixteen channels. The PLC modules would be low-cost, small-sized optical communications devices.

Access of a plurality of laser diodes (LDs) which consume currents of tens of milliamperes induces a variety of drawbacks of inter-channel interference, crosstalk and degradation caused by concentrated heating. Multicore ribbonfibers with a plurality of element fibers have a standardized pitch of 250 μm. The pitch is defined to be a distance between a center of a fiber and a center of a neighboring fiber in a ribbonfiber. A problem of a multichannel communications is a narrow pitch of 250 μm of multichannel fibers. A laser diode (LD) or a photodiode (PD) has a size from 300 μm to 500 μm at present. The narrow pitch prohibits a PLC module from aligning laser diodes in parallel at ends of the 250 μm pitch multichannel lightpaths. A contrivance was proposed for enlarging the pitch by curving lightpaths outward.

①  M. Shishikura, K. Nagatsuma, T. Ido, M. Tokuda, K. Nakahara, E. Nomoto, T. Sudoh and H. Sano, "10 Gbps×4-channel parallel LD module", Proceeding of the 2001 Electronics Society Conference of IEICE, C-3-50, p 160

FIG. 33 shows a four channel LD module with enlarging lightwaveguides proposed by ①. This is an example of four channel transmitting modules (LD modules) which can be employed in multiwavelength communications networks. The LD module is built on a bench 70. The bench 70 has a lightwaveguide layer 72 on a top. Four lightwaveguides 73, 74, 75 and 76 are produced on the lightwaveguide layer 72. Initial ends of the lightwaveguides have a pitch of 250 μm which is equal to the standardized pitch (H=250 μm) of ribbonfibers. The pitch of the lightwaveguides increases in an intermediate portion along a longitudinal direction. Final ends have a wide pitch of 1000 μm. Laser diode (LD) chips 77, 78, 79 and 80 are furnished at a 1000 μm pitch on extensions of the final ends of the lightwaveguides. The wide 1000 μm pitch secures wide spatial separation between neighboring laser diodes. ① asserted that crosstalk between neighboring channels (channels 1–2, channels 2–3 and channels 3–4) is less than −40 dB at a frequency of 10 GHz.

The known reference ① solved a problem of the narrow pitch of ribbonfibers by enlarging a width between neighboring channels to a 1 mm pitch which enables the LD module to mount laser diodes chips on extensions of the final ends of the lightwaveguides. ① succeeded in reducing crosstalk between the neighboring laser diodes by the enlarged separation.

Exploitation of PLC structures has been desired for reducing cost, increasing productivity and enhancing performance of LD modules, PD modules and LD/PD modules. Low cost, small-size, high-performance and large-scale production is indispensable for prevalence of optical communications subscriber networks. Nobody has yet suggested multichannel LD/PD modules built upon the PLC technique. There are, however, some proposals of single-channel LD/PD modules based upon lightwaveguides.

② Japanese Patent Laying Open No. 11-68705, "Two-way WDM optical transmission reception module"

proposed a single-channel LD/PD module of a PLC type having a y-branched light waveguide made upon a silicon bench. The y-branched waveguide occupies a wide area on a silicon bench. Due to the space-consuming y-branch a structure of the module proposed by ② cannot be extended to multichannel LD/PD modules for multichannel communications.

Pervasion of optical subscriber networks requires low cost and size-reduction of station LD/PD modules in addition to low cost, small-sized subscriber modules (ONU; optical network unit) which include only a single channel with a single laser diode and a single photodiode.

Many subscribers are connected to a single central station by fibers. The number of subscribers is denoted by M. M fibers are required for connecting M ONUs (subscribers) to a station. The station should have M pairs of laser diodes and photodiodes for exchanging 2M signals with M ONUs. Transmission of a plurality of signals requires ribbonfibers (tapefibers) which have 4, 8, 16 or 32 parallel element fibers in a tape.

The central station requires multichannel optical communications modules for matching with the ribbonfibers (tapefibers). If the station relied upon single-channel modules, M single-channel modules should be installed at the station for exchanging bi-directional signals with M ONUs, which would occupy very wide space in the station. If the station uses m-channel modules, the number of station modules is reduced from M to M/m. Reduction of the module number would curtail space for installing modules in the station. Multichannel modules are essential for the central station.

Most prevalently used ribbonfibers have a pitch of 250 μm. Four, eight, twelve or sixteen channel ribbonfibers have all the standardized 250 μm pitch. A plurality of element fibers align in a plane at a common pitch of 250 μm in popular flat ribbonfibers.

Current ribbonfibers (=tapefibers) have a determined, common pitch of 250 μm. The 250 μm pitch is too narrow to make multichannel LD or PD modules by aligning laser diodes or photodiodes just along extensions of the element fibers. The pitch should be enlarged, for example, to 500 μm to 1000 μm for securing enough space for laying LDs or PDs. Wide separation with margins will solve difficulties of crosstalk or thermal diffusion.

Current laser diodes or photodiodes have a width more than 250 μm in a lateral direction vertical to an axial line. Optoelectronic devices (LDs & PDs) have, in general, a lateral width from 300 μm to 500 μm for the sake of facile production, feasible mounting, easy handling and sufficient thermal diffusion.

Ribbonfibers (tapefibers) have a pitch H=250 μm too narrow for mounting devices. Installation of laser diodes or photodiodes requires pitch enlarging portions in lightpaths on a bench for coupling to a channel number of the laser diodes or photodiodes. The curving pitch enlarging portions of lightpaths will require a long and wide silicon bench having a length of 10 mm to 15 mm and a width of 6 mm to 15 mm, which depends upon the channel number. Long and wide silicon benches will cause high cost, large sized multichannel modules.

The narrow width of a 250 μm pitch of standardized ribbon fibers restricts design of optoelectronic device chips or lightwaveguides. Widening of the 250 μm pitch of ribbonfibers by giving strong curvature to lightwaveguides on silicon benches causes difficulty on designing and producing of optoelectronic (LD or PD) modules, which induces a bad yield of producing modules.

Sometimes lightwaveguides formed on a bench are not terminated by photodiodes or laser diodes. An intermediary photoactive device, which is neither an LD module nor a PD module, provides a bench with wide pitch lightwaveguides or fibers overall furnished on the bench and installs photoactive devices halfway on the lightwaveguides for giving some processing to signal beams propagating in the lightwaveguides and allowing the processed beams to go out of the lightwaveguides. In the case, a wide pitch of 500 μm to 1000 μm, on the intermediate device should be restored down to the original 250 μm pitch again. The intermediate module would require twice changes of pitches by making width enlarging curving lightwaveguides and width decreasing curving lightwaveguides. Change of the pitch increases difficulty of fabrication, raises cost of manufacturing, and reduces yield of products.

Prevalent multichannel ribbonfibers have a narrow, standardized pitch of 250 μm. Four, eight, twelve or sixteen element fibers are aligned at a 250 μm spatial period in a flat ribbonfiber.

It is difficult to mount laser diodes or photodiodes at points aligning at a pith smaller than 250 μm, because current laser diodes and photodiodes have a side larger than 300 μm at present. Discrepancy between the chip size and the channel pitch forces multichannel modules to bend lightwaveguides on a bench for securing wide space for chips. If a multichannel module is made without bending lightpaths on a bench, the multichannel module with only linear lightpaths will be a quite excellent contrivance for the future of optical communications.

A purpose of the present invention is to provide a linear multichannel surface mountable type module without curving lightpaths. Another purpose of the present invention is to provide a linear multichannel surface mountable type module having linear lightpaths which can join with a multichannel connector having a ribbonfiber of the conventional 250 μm pitch. A further purpose of the present invention is to provide a linear multichannel surface mountable type module having linear lightpaths on which photoactive devices other than laser diodes or photodiodes can be furnished.

This invention includes two types A and B. Type A means a module in which lightpaths are terminated by optoelectronic device chips. Type B means a module in which lightpaths are overall formed on a bench and are not terminated by optoelectronic devices.

[Type A (Lightpaths Terminated by Optoelectronic Devices)]

The present invention proposes a type A module having a bench, m lightpaths having a width d, having one of n kinds of lengths which is different from the lengths of neighboring lightpaths and aligning with a pitch E equal to the fiber pitch H formed on the bench, and m optoelectronic device chips having a width W which satisfies an inequality of $E<W<2E-d$ and being placed behind final ends of the lightpaths on the bench. Type A ensures sufficient space for mounting chips with enough margins by making different lengths of lightwaveguides and preparing longitudinally different sites for device chips.

The lightpath means a lightwaveguide or an optical fiber formed on a bench. The optoelectronic device means a laser diode (LD) or a photodiode (PD). A laser diode is sometimes written as a laser or an LD in short. A photodiode is sometimes abbreviated to a PD here. This invention includes a laser diode (transmitting) module and a photodiode (PD; receiving) module according to the kind of the optoelectronic devices (laser or photodiode). This invention differentiates longitudinal positions of neighboring optoelectronic devices on neighboring lightpaths. The sites of neighboring optoelectronic devices are different in a longitudinal direction. Discrepancy of the longitudinal positions of the optoelectronic device sites ensures about twice of the channel pitch for mounting the device chips. What is forbidden is the same longitudinal sites for a pair of the most neighboring devices. The next-neighboring sites can take the same longitudinal positions. There are n different longitudinal positions and m lightpaths on a bench. The number of allowable sets of chip sites is $n(n-1)^{m-1}$.

[Type B (Lightpaths Not Terminated by Optoelectronic Devices)]

The present invention proposes a type B module having a bench, m lightpaths having a width d, aligning with a pitch E equal to the fiber pitch H formed overall on the bench, m optoelectronic device chips having a width W which satisfies an inequality of $E<W<2E-d$ and being placed midway at sites which are different from neighboring sites in a longitudinal direction on the lightpaths on the bench and optionally m photoactive devices installed upon the lightpaths. Type B ensures sufficient space for mounting chips with enough margins by preparing longitudinally different sites for neighboring device chips.

Photodiodes have three different versions, that is, a top incidence type, a bottom incidence type and a front incidence type. Front incidence type photodiodes should be epi-down mounted on sites formed upon a bench by leveling an emission stripe with cores of the lightpaths. In the case of bottom incidence type photodiodes, wavelength selective filters should be inserted into the lightpaths and the photodiodes should be mounted above lightpaths just before the wavelength selective filters in order to guide the beams reflected by the wavelength selective filters into bottoms of the photodiodes.

In the type B, there are m lightpaths and n different longitudinal positions for sites of devices. Any site should be different from neighboring sites in the longitudinal direction. The number of allowable sets of sites is $n(n-1)^{m-1}$.

Optionally furnished photoactive devices are polarizers, isolators, wavelength selective filters, monitoring photodiodes, rod lenses, gratings, photomodulators, photoamplifiers and so forth.

SUMMARY OF THE INVENTION (1) The present invention proposes a low-cost, small-sized, practical surface mountable type optical communications module which is congenial to the small pitch of prevalent multichannel fibers.

(2) The present invention dispenses with enlarging and fine-curving lightpaths, which alleviates the difficulty of manufacturing and curtails fabrication cost.

(3) The present invention succeeds in decreasing electrical and optical crosstalk between neighboring channels, since optoelectronic devices are widely separated in the longitudinal direction.

(4) The modules of the present invention can be easily attached to or detached from a ribbonfiber via a connector by a couple of guidepins and guideholes.

(5) The present invention enables prevailing, inexpensive MT connectors to connect with ribbonfibers, which ensures a wide scope of applications.

(6) The modules of the present invention can be produced on mass scale by transfermolding technique.

(7) A long bench enables the present invention to install more than one photoactive device on the same lightpaths, which brings about a wide scope of applications. A multichannel laser/photodiode(LD/PD) module is obtained by mounting a laser and a photodiode on the same lightpath. A modulatable light source is built by laying a photomodulator and a laser on the same lightpaths.

(8) The present invention is suitable for making intermediary devices which are interposed between two ribbonfibers for giving some functions on light beams propagating in the multichannel fibers. The intermediate devices mean, for example, multichannel photoamplifiers, multichannel inline power monitors, and multichannel photomodulators.

(9) The modules made by the teaching of the present invention are small-sized, low-cost, highly-reliable devices suitable for mass scale production.

DETAILED DESCRIPTION OF THE PREFERRED EMBODIMENTS

Figure 1:
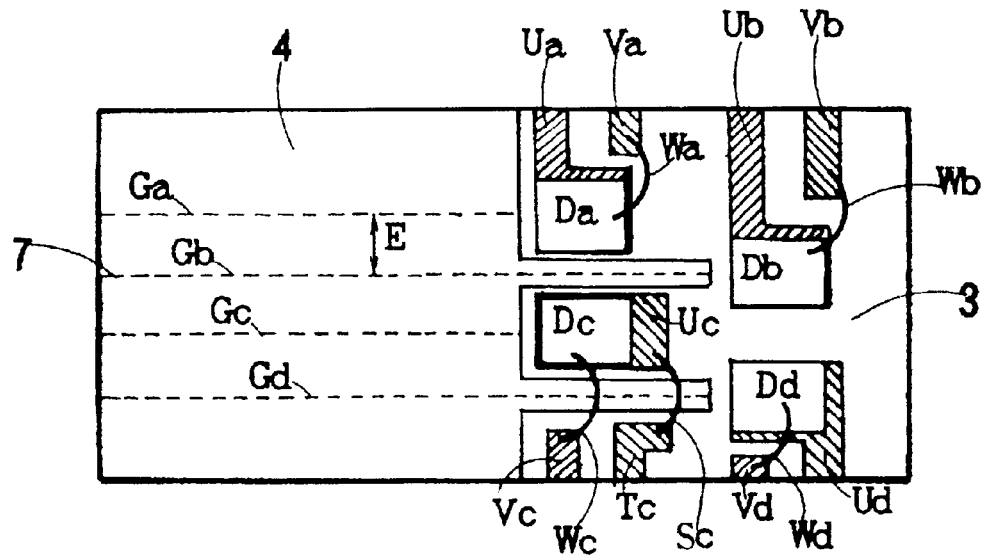
FIG. 1 is a plan view of Embodiment 1 of the present invention forming four parallel lightwaveguides whose lengths change shorter and longer reciprocally in turn with a pitch E equal to the fiber pitch H of a ribbonfiber on a bench and mounting four optoelectronic devices (LDs or PDs) on metallized pads made at reciprocally arranged points behind final ends of the lightwaveguides on the bench.

Requirements of the present invention are described.
(1) Equality of Pitches (E=H)
The pitch E of m linear lightpaths (lightwaveguides or fibers) for m channels should be equalized to the pitch H of ribbonfibers. The standardized pitch H is 250 µm. But the present invention should not be restricted to H=250 µm. For any value H, E=H should be maintained.

(2) Longitudinally Different Sites for Neighboring Optoelectronic Devices
Any pair of neighboring optoelectronic device chips should be installed at sites which are different in the longitudinal direction for allowing the device chips to occupy enough space.

(3) Optoelectronic Devices
Optoelectronic devices include light emitting devices (a) and photodetecting devices (b).
(a) Light Emitting Devices
laser diodes . . . InP-LD, InGaAsP-LD, GaAs-LD
light emitting diodes InP-LED, InGaAsP-LED, GaAs-LED
(b) Photodetecting Devices
photodiodes . . . InGaAs-PD, InGaAsP-PD, Ge-PD, Si-PD avalanche photodiode (APD)
photodiode types . . . front incidence type photodiode, top incidence type photodiode, bottom incidence type photodiode (4) Photoactive Devices (Additionally Furnished Upon Lightpaths)
(c) Photoamplifier (or Semiconductor Optical Amplifier; SOA)
A photoamplifier absorbs an input beam up and produces a stronger output beam with the same wavelength in proportion to input power. For example, a laser diode biased slightly under the threshold current amplifies input beams.
(d) Grating
A grating is one kind of diffractive optical elements which reflect only one wavelength to a determined diffraction angle by Bragg's reflection condition. Here, the grating means a planar grating which is a set of repetitions of spots with higher refractive indices along the lightpaths. The diffraction angle is restricted to be 90 degrees. A reflective wavelength can be determined by the pitch of the grating. Gratings are useful for multiwavelength networks.
(e) Photomodulator
A photomodulator (light modulator) is a device which changes light power in proportion to a bias voltage. An $LiNbO_3$ modulator, InP modulator, InGaAsP modulator, and GaAs modulator are available.
(f) Polarizer
A polarizer is a device which changes elliptical, circular polarization into linear polarization. A prism polarizer and a film polarizer are applicable.
(g) Isolator
An isolator is a cylindrical device comprising a polarizer, a Faraday rotation element, an analyzer, and a magnet. An isolator has a function of preventing beams reflected from turning back.
(h) Wavelength Selective Filter or Mirror
A wavelength selective filter is built with many piled sets of two kinds of dielectric layers with different refractive indices. A mirror is made with metallic thin films piled upon a substrate.
(i) Converging Lens
Ball lens . . . inexpensive
Rod lens . . . cylindrical lenses which are suitable for embedding in grooves
(j) Others
Prisms or others which have some action on propagating light.
(4) No Restriction on Allocation of Chips
There is no restriction upon deviation of chips. Reciprocal allocation, slantingly aligning allocation (arithmetic progression) and random allocation are available.
There are n different positions (n≦m) for sites in the longitudinal direction. The number of probable sets is given by $n(n-1)^{m-1}$. The probable set number is 2 for m=4 and n=2. The probable set number is 24 for m=4 and n=3. The set number is 108 for m=4 and n=4. For m=8, the probable set number is 2 for n=2 and 384 for n=3. Following embodiments describe only one set of probable sites but include other sets of sites implicitly.

An increment of probable position number n forces to raise a necessary length s of a bench. When a necessary length for allocating a chip is p and an extra length is r, the length s of the bench is given by s=np+r.

Although a plurality of chips with standardized widths have not been able to be arranged on the bench at a pitch of fibers, this invention can realize the arrangement of the chips on the bench. This invention can smoothly make an optical communications module of small size and low cost.

A distance between LDs and PDs can be also enlarged. Optical crosstalk and electrical crosstalk can be greatly suppressed. This invention always has this effect with no relation to widths of LDs and PDs.

Also, optical and electrical crosstalk is further reduced by allocating chips reciprocally and slantingly (like arithmetic progression).

(5) Wide Chips

In the case of chips with a wide width, if the width of the chip is W, a pitch of waveguides is E, and a width of the waveguide is d, the chip can be used when W<2E−d and the chip can be more effective when E<W<2E−d.

(6) Combination of Optoelectronic Devices and Photoactive Devices

One waveguide can have a plurality of chips thereon. For example, a combination of an isolator and an LD can be realized in a module. Integration of chips can be improved and functions of the chip are greatly progressed.

When a plurality of chips are allocated on a substrate, positions of the chips can be accurately decided by photolithography. Rapid transmission of more than 1 Gbps can be stably realized by the combination of an isolator and an LD.

(7) Leadframe and Package

This module can use a leadframe for electrically connecting with external devices. Low cost and freely wiring can electrically interface with the external devices. A package can be made by transfermolding the module with an epoxy resin. The resin molding can make this module low cost and high reliable.

(8) Guidepin and Guidepin Hole

Guidepins or guidepin holes are produced on a Si substrate for facilitating optical and electrical connection with external tapefibers. If so, the conventional standardized MT connectors can be employed for this invention and facile connection with the standardized MT connectors can be realized by the pins and holes.

(9) Possible External Devices

Optical signals processed by chips of this module can be transmitted to external tapefibers through light waveguides. For example, small sized multichannel inline monitors or small sized multichannel photoamplifying relays can be produced with low cost.

(10) Metallized Patterns

If necessary, metallized patterns for connecting PDs with external circuits can be made on most of a surface of light waveguides. And for example, a preamplifier can be also produced on the surface. Freely wiring and reception with low noise can be obtained.

Figure 2:
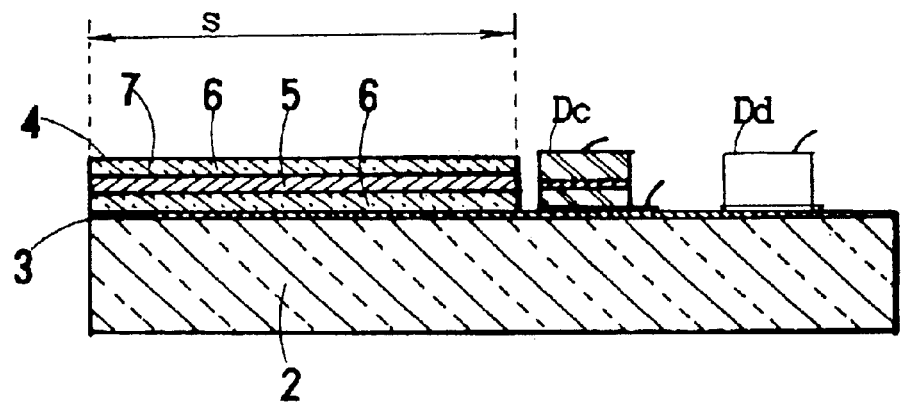
FIG. 2 is a longitudinally-sectional side view of Embodiment 1 sectioned along a shorter lightwaveguide Gc.
Figure 3:
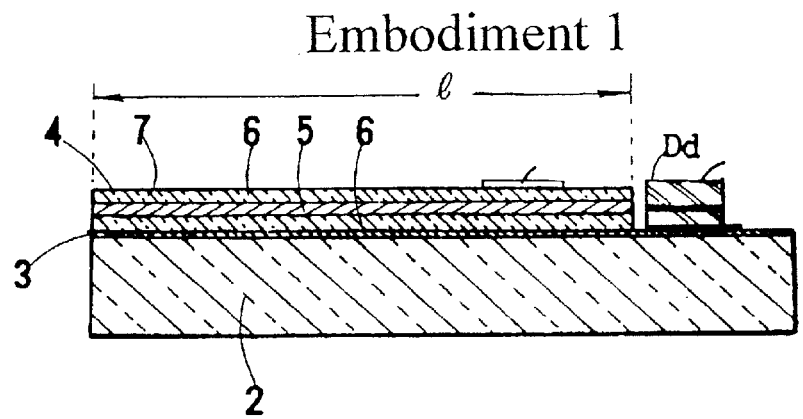
FIG. 3 is another longitudinally-sectioned side view of Embodiment 1 sectioned along a longer lightwaveguide Gd.

[Embodiment 1 (Multichannel LD Module, Multichannel Pd Module, Lightwaveguides, Reciprocal; FIGS. 1 to 3)]

Embodiment 1 makes m parallel straight shorter and longer lightwaveguides (lightpaths) of a pitch E which is equal to the pitch H of standardized m channel optical fibers on a bench and mounts m laser diodes or m photodiodes just behind ends of the m lightwaveguides on a middle portion or a rear portion of the bench reciprocally. A four channel example (m=4) is here shown in figures. Embodiment 1 can be extended also to another module of eight channels, sixteen channels or any higher number channels.

FIG. 1 denotes a plan view of Embodiment 1. FIG. 2 denotes a vertical sectioned view cut along a line on a shorter lightwaveguide. FIG. 3 shows another vertical section cut along another line on a longer lightwaveguide. Embodiment 1 builds an LD or PD module upon a rectangular bench 2. An insulating layer 3 is prepared upon the bench 2. A lightwaveguide layer 4 is formed upon a front half of the insulating layer 3 on the bench 2. The lightwaveguide layer 4 includes four parallel cores (lightpaths) 5 of a higher refractive index which are enclosed by the lightwaveguide layer as a cladding 6 with a lower refractive index. The cores, which have a square section of a e.g., 10 μm side in the cladding (lightwaveguide) layer, are aligned at a pitch of E. The lightpath pitch E is equal to the pitch H of outer ribbonfibers which will be joined to Embodiment 1. Four parallel lightpaths 7 are able to install four optoelectronic units (four laser diodes or four photodiodes) on the same bench.

Four units (LDs or PDs) are designated by A, B, C and D. Small characters a, b, c and d are affixed to objects which pertain to the units as a suffix. The lightpaths 7 are denoted by Ga, Gb, Gc and Gd. Longer lightpaths Gb and Gd of a length "l" and shorter lightpaths Ga and Gc of a length "s" are aligned in turn in a lateral direction. Ends of the lightpaths are different. The discrepancy of end points ensures enough space with a double lightpath width for accommodating optoelectronic device chips. "W" denotes a width of an optoelectronic chip. "E" is a pitch of the lightpaths. A width of the lightpath is denoted by "d". Longitudinally reciprocating ends of the lightpaths give a favorable relation satisfying an inequality of E<W<2E−d. The inequality clearly shows a gist of the present invention.

Shorter lightwaveguides (lightpaths) Ga and Gc are followed by former metallized pads Ua and Uc formed on a middle region of the insulating layer 3. Longer waveguides Gb and Gd are followed by latter metallized pads Ub and Ud formed on a rear region of the insulating layer 3. Zigzag arranged metallized pads allow the module to accommodate optoelectronic devices which are larger than the lightpath pitch E at the ends of the lightpaths. Here, the optoelectronic devices "D" are photodiodes (PDs) or laser diodes (LDs). A metallized pad Va is made near the metallized pad Ua. Metallized pads Vc and Tc are produced on the outside of the pad Uc for connecting an inner Dc chip since the Dc chip has no extra space. Da is connected with Va by a wire Wa and Dc is connected with Vc by a wire Wc. The metallized pads Uc and Tc are connected by a wire Sc.

A metallized pad Ub is made at the end of the longer lightwaveguide Gb and a metallized pad Ud is made at another end of another longer lightwaveguide Gd. And an optical device Db is bonded on the pad Ub and another optical device Dd is also bonded on the pad Ud. Another metallized pads Vb and Vd are made near Ub and Ud for connecting Db or Dd. The optical device Db is wire-bonded to the pad Vb by a wire Wb and the optical device Dd is also wire-bonded to the pad Vd by another wire Wd. Here, these optical devices Da, Db, Dc and Dd are all photodiodes or all laser diodes and do not include both PDs and LDs.

Since the lightwaveguides have different lengths, rear ends of the lightwaveguides are reciprocally positioned at forward points (Ga & Gc) or at backward points (Gb & Gd). Positions of mounting optoelectronic chips are not equal but different in the longitudinal direction. Zigzag arrangement of chips is a feature of the present invention. A current automatic chip mounting apparatus can easily mount chips at zigzag-lying spots on a substrate. This is an example of lightwaveguides as lightpaths. Alternatively, optical fibers can be parallel lightpaths embedded in a silicon bench instead of the lightwaveguides.

The lightwaveguides can use $SiO_2$ type waveguides. In this case, a clad of the waveguide is made of $SiO_2$ and a core of the waveguide is made of Ge doped $SiO_2$. The core has a section of 6 μm side. An upper clad or lower clad has a 10 μm thickness. The lightwaveguides can be made by spattering or a CVD method. As a lightwaveguide, besides the $SiO_2$ type, a polymer type lightwaveguide can be often used. The $SiO_2$ type waveguide has an advantage of less transmission loss. Having a little bigger transmission loss, the polymer type waveguide has an advantage of facile production by spin coating with low cost.

A silicon single crystal can be utilized as the bench 2, which is called a silicon bench. Ceramics and metals can be materials for the bench. A ceramic ($Al_2O_3$, AlN, SiN, ZrO, TiO etc.) bench has an advantage of insulating electric circuits and devices from each other due to high resistivity. A metallic bench should be preliminarily coated with an insulating film. The insulating film 3 is indispensable for a metallic bench or silicon bench. A ceramic bench can dispense with the insulating film 3. In the case of a Si substrate, the insulating film 3 is of $SiO_2$ made by heat-oxidizing or a CVD method. When the rectangular Si substrate of 2 mm×5 mm is utilized, four channel units can be deposited on the substrate. If a size of the substrate is enlarged, eight channel or sixteen channel units can be realized on the substrate. Even if a number of the channels or the waveguides increases, the advantage of zigzag chip arrangement is unchanged.

Laser diode chips or photodiode chips utilized in optical communications have a length of 300 μm to 500 μm, a width of 300 μm to 500 μm and a thickness of 150 μm to 400 μm. Since the fiber pitch H of a ribbonfiber is 250, μm, the pitch E of linear lightwaveguides formed on a silicon bench is also 250 μm. When the path width d is d=26 μm, the chip width W should satisfy an inequality of 250 μm<W<474 μm, which is a moderate range.

In the case of LD modules, laser diodes are epi-down mounted on metallized pads at positions which allow emission stripes of the LDs to align along extensions of the lightwaveguides. In the case of PD modules, front incidence type photodiodes are used. For optical communications of 1.3 μm and 1.5 μm wavelengths, InGaAsP type laser diodes or InGaAs type photodiodes can be utilized.

The FIGS. 1 to 3 of Embodiment 1 illustrate a half-produced module having the chips on the substrate, but actually, a leadframe should be installed on the module, a transparent resin should cover between waveguide ends and chips, another resin should cover other space and the module should be installed in a package. After this, such concrete structures will be described in another Embodiments of this invention.

Figure 4:
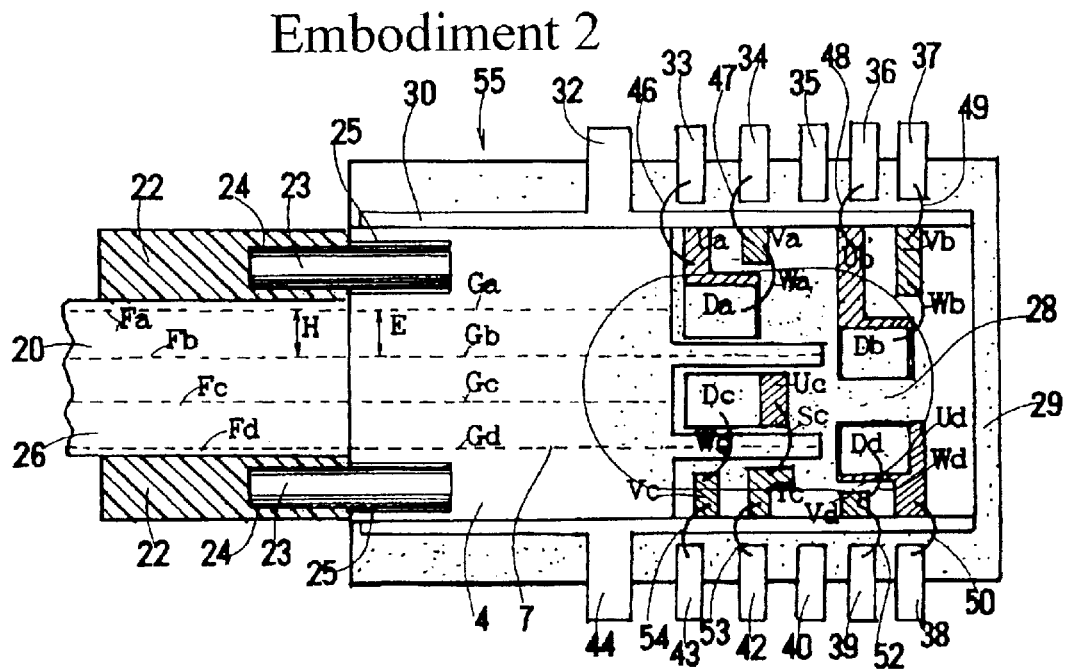
FIG. 4 is a horizontally-sectioned plan view of Embodiment 2 forming four parallel lightwaveguides whose lengths change shorter and longer reciprocally in turn with a pitch E equal to the fiber pitch H of a ribbonfiber on a bench, mounting four optoelectronic devices (LDs or PDs) at reciprocally arranged points behind final ends of the lightwaveguides on the bench, fixing the bench upon a leadframe, connecting metallized patterns to leadpins by wirebonding, fixing guidepins on V-grooves and being encapsulated in a resin package, which is in a coupled state with an MT connector maintaining ends of a ribbonfiber.
Figure 5:
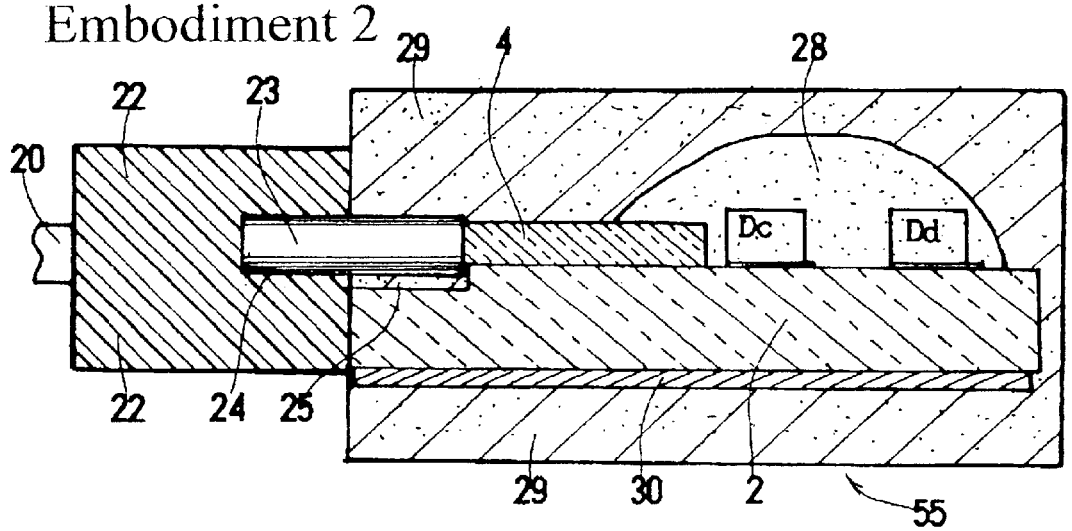
FIG. 5 is a vertically-sectioned side view of Embodiment 2 sectioned along a longitudinal line crossing a guidepin.
Figure 6:
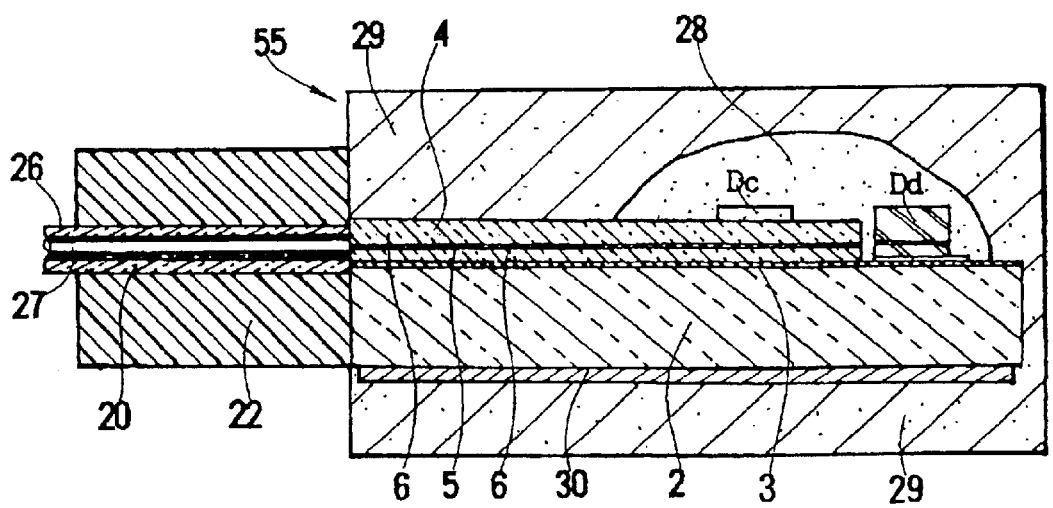
FIG. 6 is a vertically-sectioned side view of Embodiment 2 sectioned along another longitudinal line crossing a longer lightwaveguide Gd.

[Embodiment 2 (Leadframe, MT Connector, Transparent Resin; FIGS. 4 to 6)]

This Embodiment clarifies how to interface with external devices concretely. FIG. 4 denotes a plan view of Embodiment 2. FIG. 5 denotes a vertical sectional view cut along a plane including a guidepin. FIG. 6 shows another vertical section cut along a plane including a longer lightwaveguide.

Embodiment 2 lays a prepared bench on a leadframe, covers a part with a transparent resin, fits guidepins on the bench and packages the bench with an outer rigid resin for coupling to an MT connector having a ribbonfiber by guidepins and guideholes. The outer resin package is formed by transfermolding in a metallic mold. The guidepins and guideholes ensure facile attachment to and detachment from the MT connector. Other features are similar to Embodiment 1.

In FIGS. 4, 5 and 6, Embodiment 2 is built upon a rectangle bench 2. An insulating layer 3 is made upon the bench 2. A lightwaveguide layer 4 is produced upon the insulating layer 3. Four parallel linear lightwaveguides (lightpaths) Ga, Gb, Gc and Gd with reciprocally varying lengths are formed in the lightwaveguide layer 4 at a pitch E. The lightwaveguides are cores of a higher refractive index produced in the lightwaveguide layer of a lower refractive index as a cladding. Ga and Gc are shorter lightpaths. Gb and Gd are longer lightpaths. Final ends of Ga and Gc lie at middle spots. Final ends of Gc and Gd lie at backward spots. Space just behind the final ends of the lightpaths is bases for mounting optoelectronic chips. Metallized patterns are printed upon the bases at the back of the lightpath final ends. Optoelectronic devices (laser diodes or photodiodes) Da, Db, Dc and Dd are mounted upon the metallized patterns. The metallized patterns are joined to other patterns or leadpins by wirebonding. Details are not described, since the metallizes, wires and leadpins are similar to Embodiment 1. The optoelectronic device chips mean either laser diodes (LDs) or front incidence photodiodes (PDs) which are epi-down mounted.

A ribbonfiber 20 is a long cable for optical communications and has four optical fibers Fa, Fb, Fe and Fd in the same plane. A pitch H of the four fibers Fa, Fb, Fe and Fd in the ribbonfiber 20 is 250 μm. The 250 μm pitch H is too narrow to allocate chips thereon, so that the present invention has an effective structure for the narrow pitch. An MT connector 22 enclosing the ribbonfiber 20 is used for connecting the ribbonfiber 20 to external optical devices. The MT connector 22 fixes an end of the ribbonfiber 20 with a resin. At the end of the ribbonfiber 20, the four element fibers Fa, Fb, Fe and Fd appear on the same plane. As shown in FIG. 6, each of the four element fibers in the ribbonfiber 20 has a core 27 and the core 27 is coupled with a core 5 of the lightwaveguide 4. The fiber core 27 is enclosed with a clad up and down.

Either guidepins 23 or guideholes 24 are made at peripheries on a front end of the package for connecting the MT connector to the module. V-grooves 25 are made on a forefront of the module for fixing own guidepins or allowing connector guidepins to attach or detach. In a case, an MT connector has guidepins and a module has guideholes. In another case, a connector has guideholes and a module has guidepins.

The bench 2 is glued to a central part (base metal) of a leadframe 30 which has been prepared by punching a metallic thin plate into an outer frame, leadpins connecting to the outer frame and the base metal connected by the leadpins to the outer frame. When the bench 2, the base metal of the leadframe and devices have been packaged, outer portions of the leadpins are cut from the outer frame and the leadpins projecting outward remain on side of a package.

FIG. 4 shows the leadpins separated from the outer frame, which has unified all leadpins and the base metal in a single plate. The leadframe 30 comprises leads 32–40, 42, 43 and 44 at both peripheries and the wide base metal 30 at the center. The leads 32 and 44 are ground-leads connecting to the base metal 30. Other leadpins are joined to metallized patterns connected with optoelectronic devices Da, Db, Dc and Dd via wires.

Metallized pads Ua and Va for the optoelectronic device Da are joined via wires 46 and 47 to the leadpins 33 and 34. Metallized pads Ub and Vb for Db are connected via wires 48 and 49 to the leadpins 36 and 37. Other devices Dc and Dd are connected to the outer leadpins via wires in a similar manner.

When the optoelectronic devices have been coupled to the leadpins by wirebonding, an elastic transparent resin 28 is supplied on the bench 2 for filling space between ends of the lightwaveguides Ga to Gd and the optoelectronic devices Da to Dd. The transparent resin 28 should have a refractive index similar to the waveguides for suppressing scattering and reflection at the ends of the lightwaveguides. Then, the half-products, which include the silicon bench, the devices, the leadpins and the wires, are transfermolded in a metallic mould with a rigid resin 29, for example, an epoxy resin for packaging.

A plastic-packaged optoelectronic module 55 has been produced. In the module 55, the packaging resin 29 encloses the bench 2, the devices Da to Dd, the base metal and roots of the leadpins. Ends of the leadpins project from the sides of the package resin 29. A front of the package has either guidepins projecting forward or guideholes perforated backward in the longitudinal direction.

FIGS. 4, 5 and 6 demonstrate Embodiment 2 coupled with the MT connector 22 on the left. Only the righthand portion shows the module.

Figure 31:
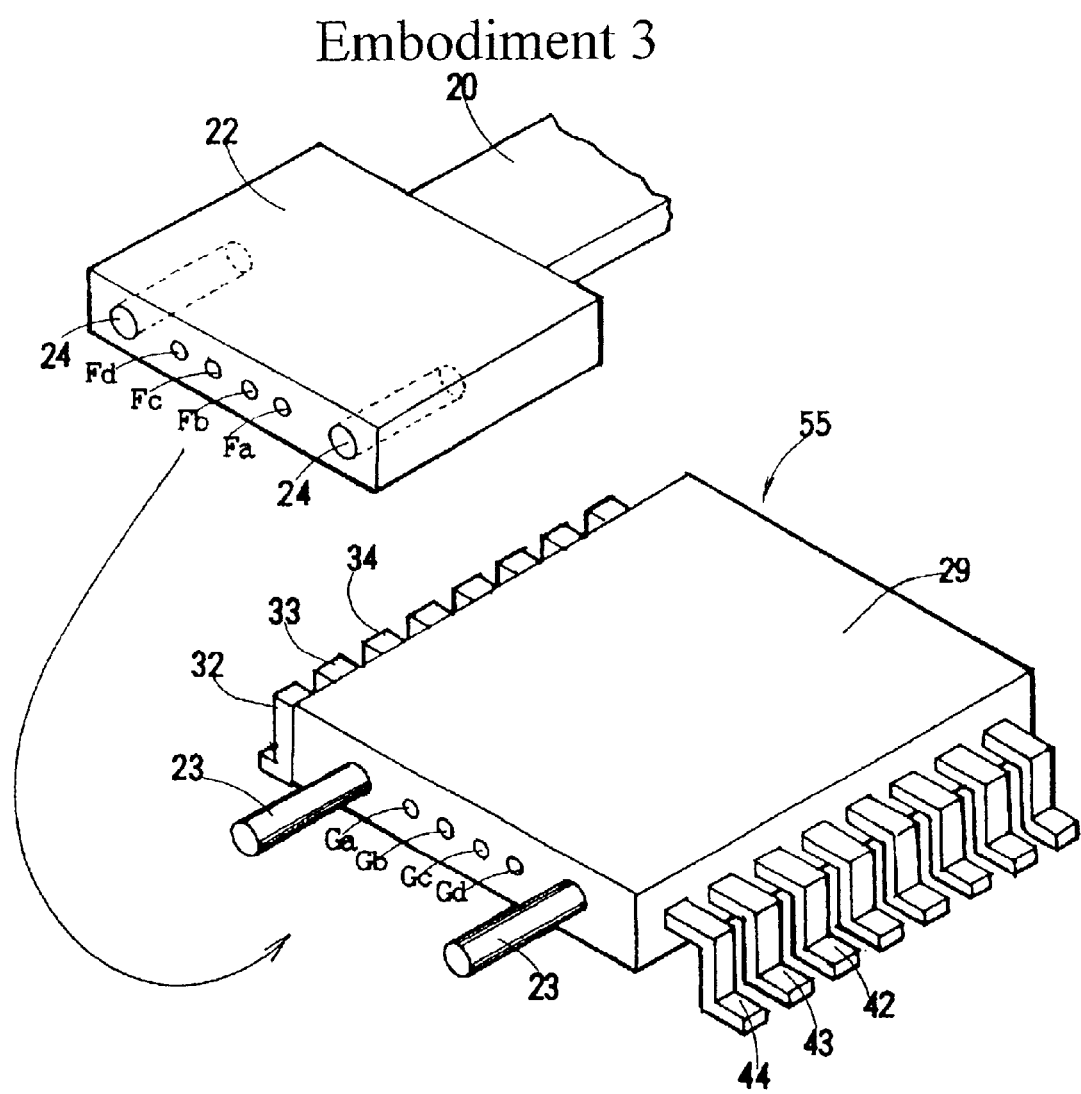
FIG. 31 is a perspective view of Embodiment 3 having guidepins on a front for attaching to and detaching from an MT connector with guideholes.

[Embodiment 3 (Guidepins/Module & Holes/Connector; FIG. 31)]

Allocation of guidepins and guideholes is alternative to a connector and a module. Embodiment 2 can otherwise be a module with guideholes for coupling to a connector with projecting guidepins. Two kinds of allocation of pins and holes are described here. Embodiment 3 allots pins to a module and holes to a connector.

FIG. 31 denotes a guidepin-carrying module and a guidehole-bearing connector. In the module, guidepins 23, which are embedded with an adhesive in V-grooves formed on the bench 2 at inner roots, project from the forefront of the module 55. On the forefront, front ends of the lightwaveguides Ga, Gb, Gc and Gd align at a 250 $\mu$m pitch in the same plane as the forefront.

An MT connector 22 has a ribbonfiber 20 tailing from the back. Guideholes 24 and 24 are formed on the front of the connector 22 in the longitudinal direction. Ends of the fibers Fa, Fb, Fc and Fd appear on the connector front at the common pitch (H=250 $\mu$m). When the guidepins 23 and 23 are inserted into the guideholes 24 and 24, the ends of Fa, Fb, Fc and Fd of the ribbonfiber come into contact with ends of Ga, Gb, Gc and Gd of the module.

Figure 32:
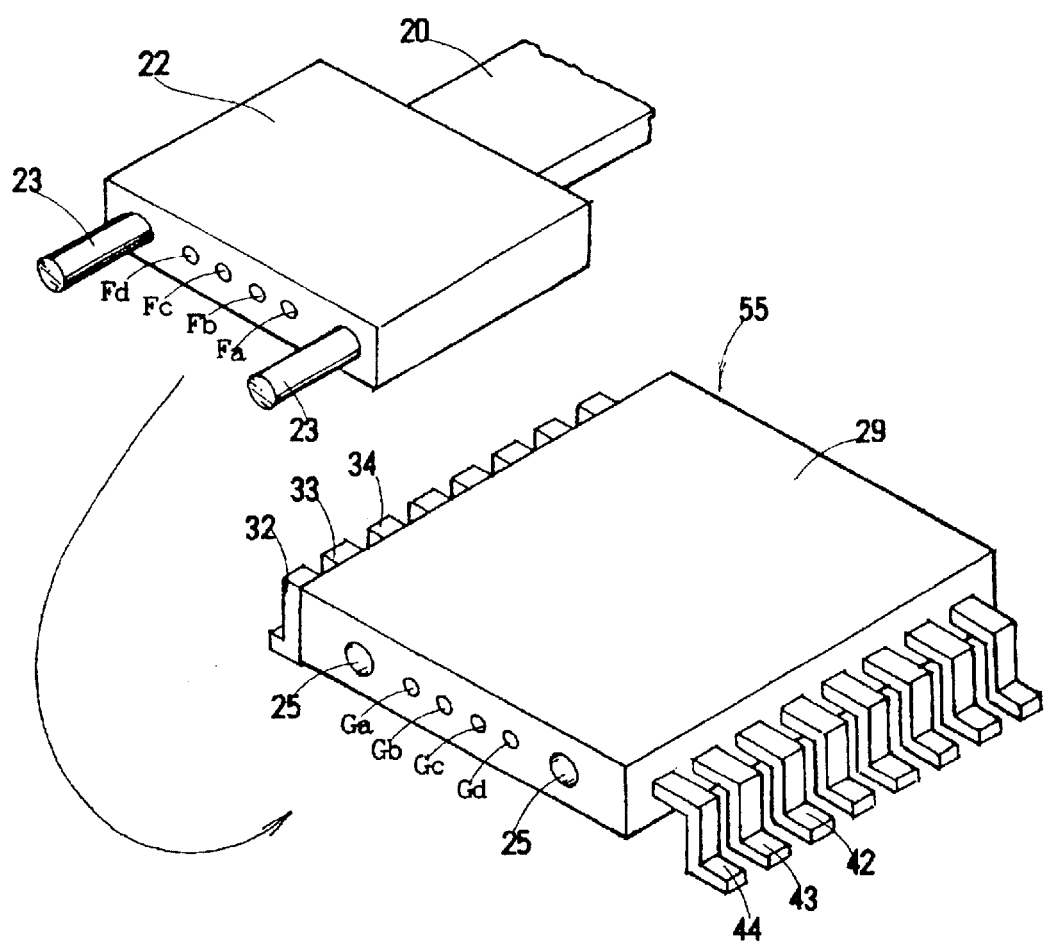
FIG. 32 is a perspective view of Embodiment 4 having guideholes on a front for attaching to and detaching from an MT connector with guidepins.
Figure 33:
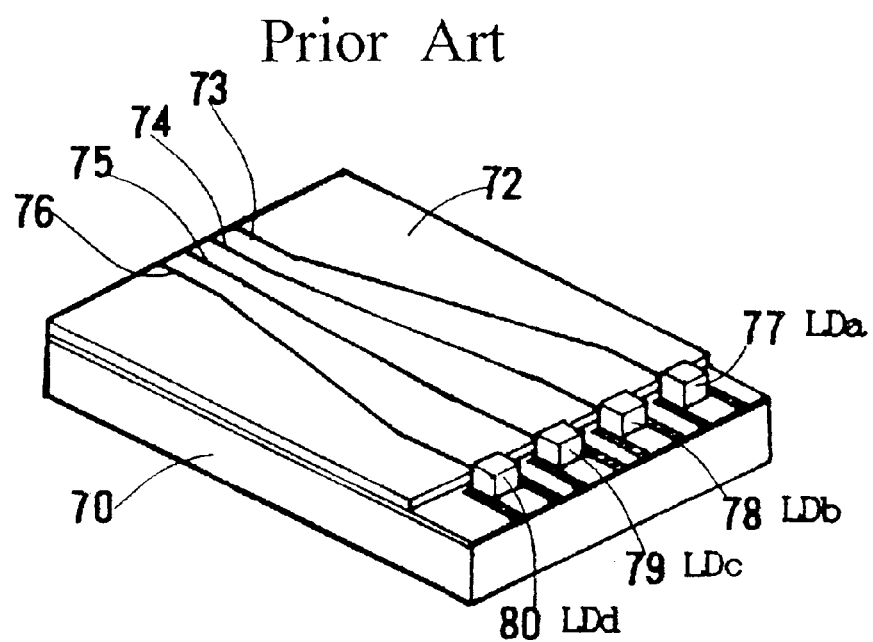
FIG. 33 is a perspective view of the known parallel laser diode module having enlarging lightwaveguides proposed by ① M. Shishikura, K. Nagatsuma, T. Ido, M. Tokuda, K. Nakahara, E. Nomoto, T. Sudoh and H. Sano, "10 Gbps×4-channel parallel LD module", Proceedings of the 2001 Electronics Society Conference of IEICE, C-3-50, p 160.

[Embodiment 4(Guideholes/Module & Pins/Connector; FIG. 32)]

FIG. 32 shows Embodiment 4 which assigns guidepins to a connector (MT connector) and guideholes to a module. The guidepins 23, which are inserted and fixed in longitudinal holes of the MT connector 22, project forward. Ends of fibers Fa, Fb, Fc and Fd appear on the front surface of the connector. Guideholes 25 and 25 are prepared in the longitudinal direction on the front of the module 55. Front ends of lightwaveguides Ga, Gb, Gc and Gd align on the front at a 250 $\mu$m pitch.

When the guidepins 23 and 23 of the MT connector 22 are infixed into the guideholes 25 and 25 of the module 55, the ends Fa, Fb, Fc and Fd of the ribbonfiber face and butt to Ga, Gb, Gc and Gd of the lightwaveguides of the module 55.

Figure 7:
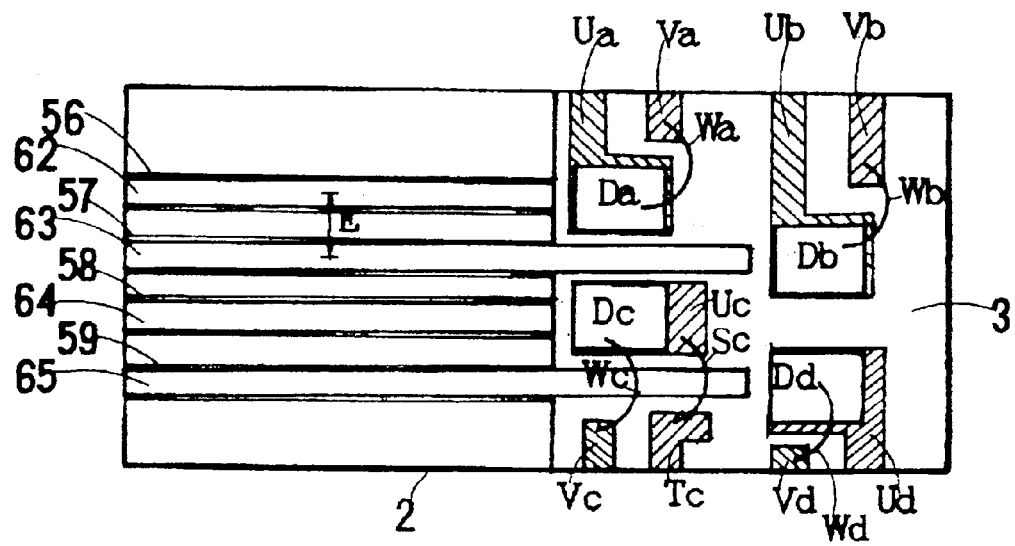
FIG. 7 is a plan view of Embodiment 5 of the present invention furnishing four parallel optical fibers whose lengths change shorter and longer reciprocally in turn with a pitch E equal to the fiber pitch H of a ribbonfiber in V-grooves on a bench and mounting four optoelectronic devices (LDs or PDs) on metallized patterns formed at reciprocally arranged points behind final ends of the optical fibers on the bench.
Figure 8:
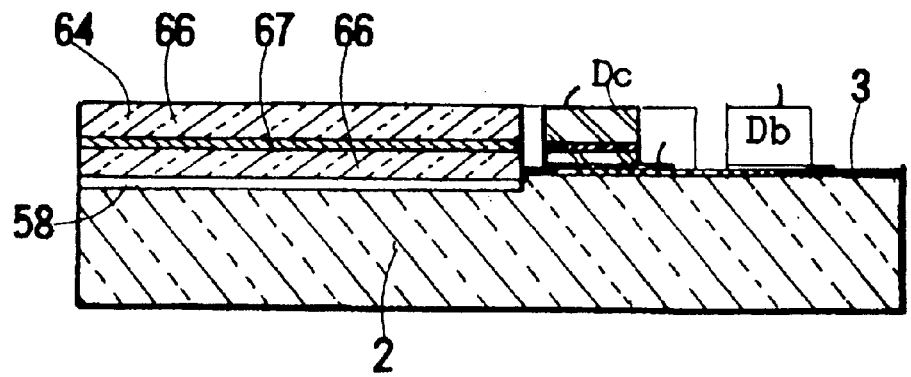
FIG. 8 is a vertically-sectioned side view of Embodiment 5 sectioned along a longitudinal line crossing a shorter optical fiber and a device Dc.
Figure 9:
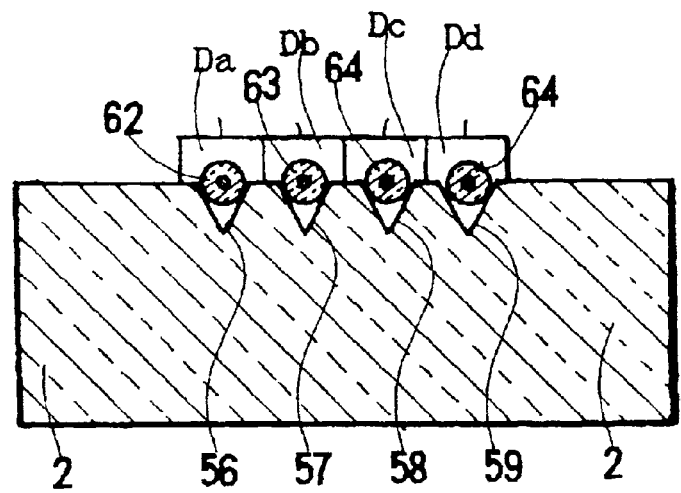
FIG. 9 is a vertically-section front view of Embodiment 5 sectioned along a lateral line crossing the V-grooves.

[Embodiment 5 (Fiber Lightpaths, Multichannel LD or PD Module, Reciprocal Lengths; FIGS. 7 to 9)]

A gist of the present invention is to ensure sufficient space of a (2E−d) width to a chip by differentiating lengths of the lightpaths on the bench. Although the lightpaths are not curved but straight, differentiation of lengths enables a module to find an enough room for mounting a chip which is larger than the lightpath pitch E. Two different kinds of lightpaths are available for preparing on a bench. One kind is a lightwaveguide. The other kind is an optical fiber. Both lightwaveguides and optical fibers are equivalently useful as lightpaths on a bench. Embodiment 5 employs optical fibers as lightpaths built on the bench.

FIG. 7 shows a plan view of a main portion of Embodiment 5 on a bench. FIG. 8 is a sectional side view of the bench portion of the same cut along a shorter optical fiber (lightpath). FIG. 9 is a sectional view of the same cut along a vertical plane perpendicular to the optical fibers.

Parallel V-grooves 56, 57, 58 and 59 with different lengths are perforated at a pitch E on a front half of the bench 2. Four V-grooves have different lengths. The V-grooves 56 and 58 are shorter. The other V-grooves 57 and 59 are longer. Optical fibers 62, 63, 64 and 65 are embedded into the V-grooves. Each optical fiber has the same length as the pairing V-groove. The optical fiber consists of a core 67 with a higher refractive index and a cladding 66 with a lower refractive index which encloses the core.

A quartz single-mode fiber has a cladding of a 125 $\mu$m diameter and a core of a 10 $\mu$m diameter. The length difference between longer fibers and shorter fibers should be determined to give an enough room for allowing a chip to lie thereupon. Metallized patterns Ua to Ud, Va to Vd and Tc are produced on the bench 2. This example mounts optoelectronic devices Da and Dc at former spots and Db and Dd at backward spots. Electrodes of chips are joined to the metallized patterns by wirebonding like Embodiments 1 and 2. The whole of Da, Db, Dc and Dd are either a set of photodiodes or a set of laser diodes. The number of the devices is equal to the number m of channels.

In this case, available space for mounting a chip has a width of W=(2E−d), where d is a width of a lightpath and E is a pitch of the lightpaths. Although a lightwaveguide has a small width, an optical fiber has a large width of d=125 $\mu$m. Since E =250 $\mu$m and d=125 $\mu$m, the allowable width for a chip base is 250 $\mu$m<W<375 $\mu$m. The (2E−d) allows space to mount a chip of, e.g., a 300 $\mu$m side.

FIGS. 7, 8 and 9 denote only a half-product. This Embodiment is also completed by supplying a transparent resin, fitting leadpins, forming wiring patterns, making guidepins/holes and transfermolding the half-product with a resin into a package like Embodiments 1 and 2.

Figure 10:
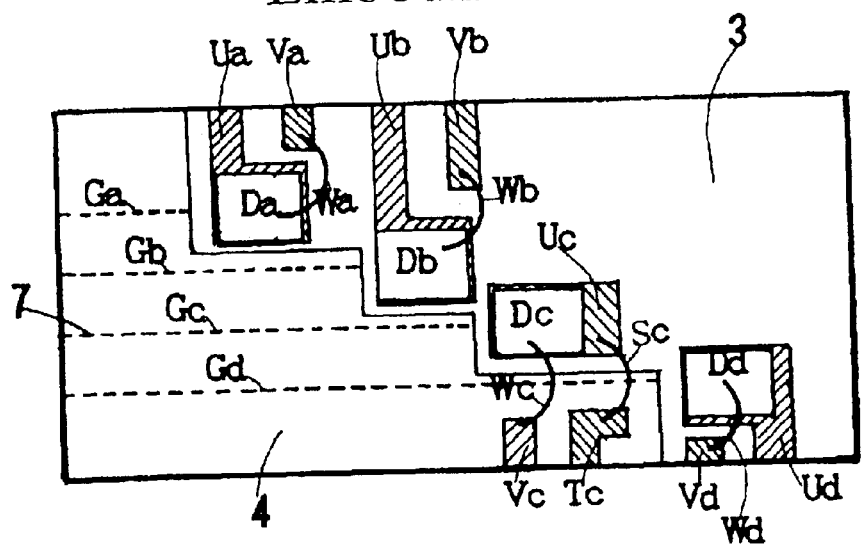
FIG. 10 is a plan view of Embodiment 6 forming four parallel lightwaveguides whose lengths linearly increase from the shortest Ga to the longest Gd in this order with a pitch E equal to the fiber pitch H of a ribbonfiber on a bench, mounting four optoelectronic devices (LDs or PDs) on metallized pads formed at linearly distance-increasing points behind final ends of the length-increasing lightwaveguides on the bench.
Figure 11:
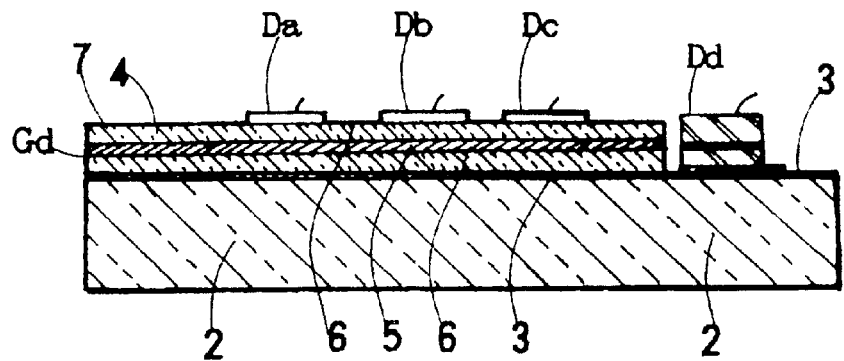
FIG. 11 is a vertically-sectioned side view of Embodiment 6 sectioned along a longitudinal line crossing the longest lightwaveguide Gd.

[Embodiment 6 (Four Step End Lightpaths, Multichannel PD/LD Module; FIGS. 10 and 11)]

The former Embodiments employed a reciprocal change of path lengths at two steps and settled the ends of the paths at two different distances. The least of the number n of longitudinally different lengths is 2. In general, the number n of longitudinally different lengths is m in the case of m fibers and m channels. The greatest number of the different lengths of the lightpaths is also m. The number of the different lengths is from two to m (2≦n≦m).

A smaller number n of different lengths enables a module to reduce the length of a bench further. However, a small number n of different path lengths is unsuitable for decreasing crosstalk (inter-channel crosstalk) among the optoelectronic chips.

A larger number n of different path lengths forces to use a bench of a longer length. A large bench can suppress inter-channel crosstalk by separating the optoelectronic chips. A wide bench has an additional advantage of admitting extra space to accommodate other devices, circuits and patterns.

The present invention differentiates lengths of every pair of neighboring lightpaths. Different pathlengths mean that neighboring lightpaths have different final ends, because the initial positions are all equal. In the case of four channel (m=4) having only two final positions (n=2) like Embodiments 1–5, the number Q of probable sets of lightpaths is Q=2. The number Q of probable sets increases as the permitted final positions rise. If three final positions are permitted (n=3), the probable set number is enhanced to Q=24. When four final sets are allowed (n=4), Q=108 sets of pathlengths are permitted. This relation is valid for four channel cases. An increment of the channel number, for example, eight channel, sixteen channel, heightens further the number of probable sets of different lightpaths.

General formulae should be derived here. When an object system has m channels and a module permits n positions for final spots of lightpaths, the number of probable sets of different lightpaths is $Q=n(n-1)^{m-1}$. A variety of sets of probable lightpaths increases a degree of freedom and decreases mutual crosstalk. However, the increase of final positions has a drawback of elongating the bench. Space for accommodating a single device is denoted by "p". Extra space is given by "r". A necessary length s of a bench is given by s=np+r.

FIG. 10 and FIG. 11 shows Embodiment 6 which is a four channel (m=4) example with four final positions (n=4). Embodiment 6 has four lightpaths Ga, Gb, Gc and Gd with stepwise increasing pathlengths in this order. Optoelectronic chips Da, Db, Dc and Dd, which align along a slanting line, have base sites stepwise receding at a pitch of p in the same order.

Sets of metallizes Ua and Va, Ub and Vb, . . . are allotted along the slanting line on a lightwaveguide layer 4 on a bench 2. Dc has metallizes Vc and Tc on the lightwaveguide layer 4 in this example. Vc and Tc have a different height from other metallizes. A lightwaveguide made of silicon dioxide ($SiO_2$) has a 6 μm square core and 10 μm thick under-& over-cladding layers. A total of the lightwaveguide layer is 26 μm, which is a small difference of heights for wiring patterns.

In FIG. 10, Da, Db, Dc and Dd have vacant sides on an insulating layer 3. Since the optoelectronic chips should be fitted on the sites lying on extensions of the lightpaths Ga, Gb, Gc and Gd, the width W for allowing to a single chip is restricted by E<W<2E−d, which is similar to the former examples.

The optoelectronic devices mean either laser diodes or photodiodes. Embodiment 6 can give a four channel transmitting (LD) module by installing four laser diodes epi-down (upside down) on the sites. In LD cases, the vacant space can be utilized by mounting LD-driving ICs. Otherwise, Embodiment 6 can give a four channel receiving (PD) module by mounting four front-incidence type photodiodes on the slanting sites. In the case of PD modules, a four-channel preamplifier or four preamplifiers can be furnished upon the vacant space on the insulating layer 3, which reduces external noise.

Embodiment 6 is an example of four channel modules with four different final positions n=4. Four channel ones (m=4) with four positions (n=4) have other 107 cases than the one described in FIG. 10. Descriptions of the other 107 cases are omitted for avoiding tedious repetitions.

Figure 12:
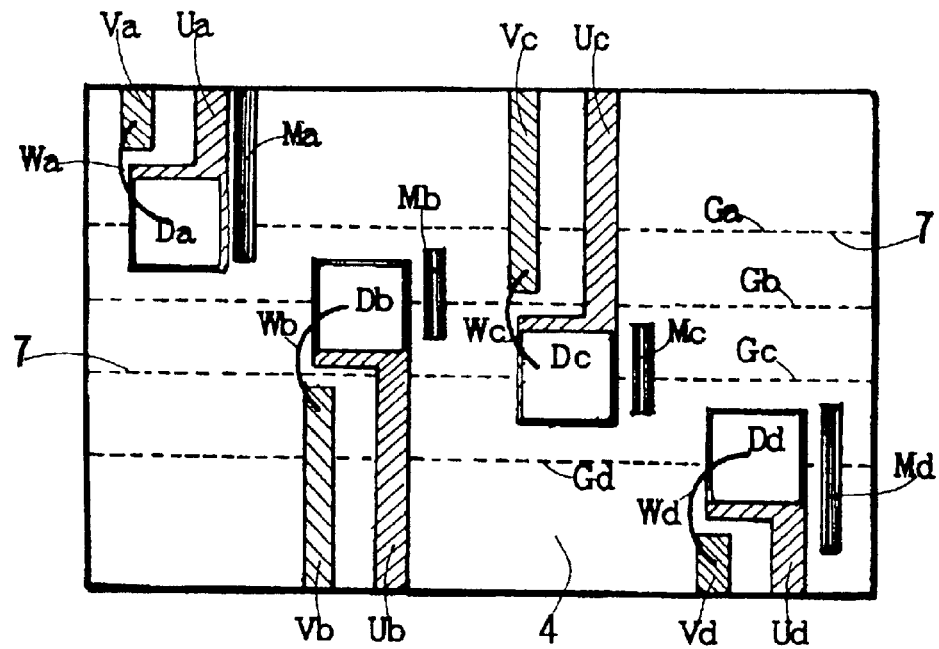
FIG. 12 is a plan view of Embodiment 7 forming four parallel overall lightwaveguides with a pitch E equal to the fiber pitch H of a ribbonfiber on a bench, mounting four optoelectronic devices (LDs or PDs) on metallized pads formed at points whose distances from the front edge linearly increase halfway on the lightwaveguides and connecting the optoelectronic devices to metallizes by wirebonding.
Figure 13:
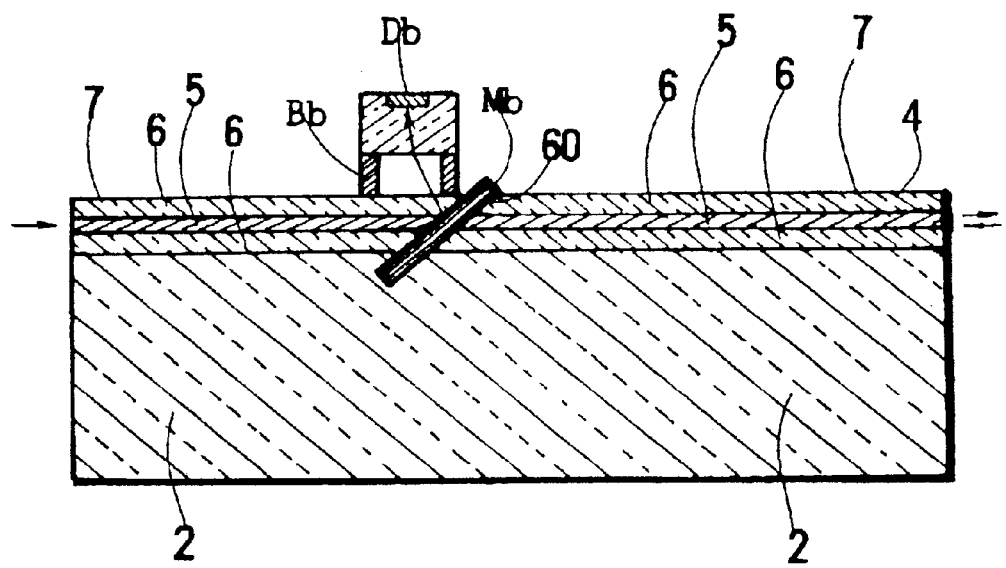
FIG. 13 is a vertically-sectioned side view of Embodiment 7 cut along a longitudinal line crossing an overall lightwaveguide Gb.

[Embodiment 7 (Multichannel PD Module, Bottom Incidence PD; FIGS. 12 and 13)]

All the embodiments described hitherto can be applied both to LD modules and PD modules. In the case of PD modules, only front incidence type photodiodes are available, since the photodiodes are upside down fitted on the sites. Photodiodes have other types of top incidence type and bottom incidence type. The bottom incidence type ones are preferable photodiodes which have a wide aperture, high sensitivity, a wide tolerance and feasible installation. FIGS. 12 and 13 show Embodiment 7 of another 4-channel PD module built with bottom incidence type photodiodes.

A lightwaveguide layer 4 is prepared overall upon a bench 2. Four parallel straight lightwaveguides Ga, Gb, Gc and Gd are made from an initial end to a final end of the bench 2. If the lightpaths (lightwaveguides) extend to the rear ends, other four channel devices can be serially connected to the final ends. The bottom incidence type allows a lightpath to extend over the photodiode, which gives an extra degree of freedom of designing. Lightwaveguides (lightpaths) 7 are, in practice, cores 5 (FIG. 13) enclosed by claddings 6 which are equivalent to the lightwaveguide layer 4 like former embodiments. There is a slight difference of refractive indices between the core 5 and the cladding 6. Hole-carrying submounts Ba, Bb, Bc and Bd are mounted and wavelength selective filters Ma, Mb, Mc and Md are slantingly embedded halfway upon four channel lightpaths Ga, Gb, Gc and Gd. The wavelength selective filters play a role of selectively reflecting a set of beams propagating from the front ends slantingly upward to holes of the submounts and allowing another set of beams propagating from the rear ends. Bottom incidence type photodiodes are bonded upon metallizes on the submounts which enable the photodiode to catch the beams reflected by the wavelength selective filters.

The wavelength selective filters are made by piling two kinds of dielectric films with different thicknesses and refractive indices in turn on a transparent substrate. The wavelength selective filters should be designed for reflecting only PD-receiving beams and permitting LD-emanating beams to pass. FIG. 13, which is a section along the longitudinal lightpath Gb, denotes a beam going into the photodiode Db.

Embodiment 7 allows another module to follow the final ends of the lightwaveguides, because the lightwaveguides travel all the length of the silicon bench. Embodiment 7 admits another wavelength beams to go into the waveguides via the rear ends out of another LD module. The final ends of lightwaveguides are not determined by the positions of optoelectronic devices unlike former embodiments.

Slanting grooves 60 for embedding the wavelength selective filters can be made by dicing mechanically. Otherwise, the slanting grooves 60 can be made by milling the bench by FIB (focused ion beam).

Embodiment 7 has been prepared for bottom incidence type photodiodes, which have advantages of easy fabrication, a wide sensing region and high sensitivity. Metallizes Ub, Vb, Ud and Vd extend toward a lower side (in FIG. 12) and metallizes Va, Ua, Vc and Uc stretch toward a higher side. Reciprocal wirings have an advantage of reducing electrical crosstalk between neighboring channels.

Since the photodiodes are lifted up by the submounts above the lightwaveguides, space for the photodiodes is not restricted by the lightpath pitch of E=250 μm. The wavelength selective filters Ma, Mb, Mc and Md, which cross over own lightpaths, are subject to the inequality E<W<2E−d.

[Embodiment 8 (Grating-Carrying LD or PD Module; FIGS. 14 to 17)]

Figure 14:
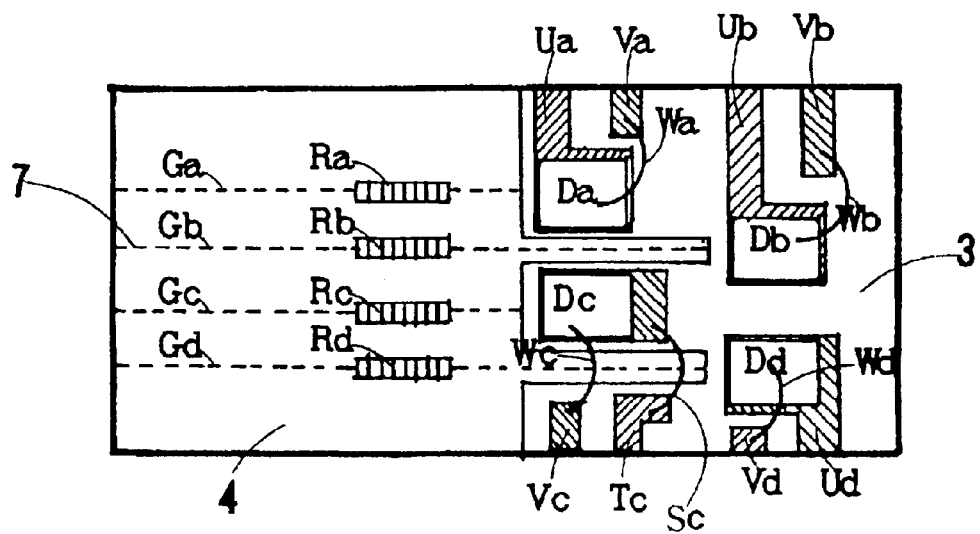
FIG. 14 is a horizontally-sectioned plan view of Embodiment 8 forming four parallel lightwaveguides whose lengths change shorter and longer reciprocally in turn with a pitch E equal to the fiber pitch H of a ribbonfiber on a bench, making gratings on the lightwaveguides, mounting four optoelectronic devices (LDs or PDs) at reciprocally arranged points behind final ends of the lightwaveguides on the bench and connecting metallized patterns to leadpins by wirebonding.
Figure 15:
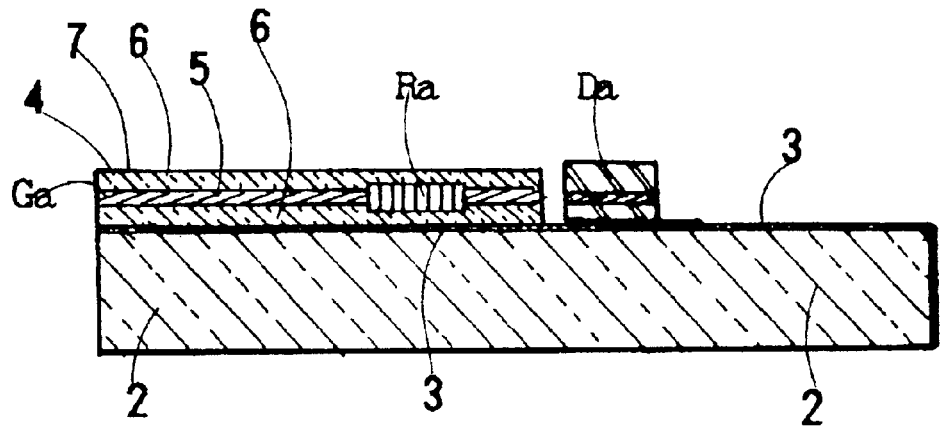
FIG. 15 is a vertically-sectioned side view of Embodiment 8 sectioned along a shorter lightwaveguide Ga.

The present invention allows modules to interpose gratings halfway on lightwaveguides 7. Embodiment 8 produces gratings on the lightwaveguides 7 (Ga, Gb, Gc and Gd). FIG. 14 is a plan view and FIG. 15 is a sectional view of Embodiment 8. Embodiment 8 includes the lightwaveguides 7, optoelectronic devices Da, Db, Dc and Dd and metallizes Ua to Vd in a manner similar to Embodiment 1. In addition to fundamental portions, Embodiment 8 adds gratings (diffraction elements) Ra, Rb, Rc and Rd midway on the lightwaveguides 7.

A grating as an individual optical part has a periodic structure repeating parallel hills and grooves in turn at a predetermined period. The grating period b is determined for satisfying Bragg's condition $2b \sin \theta = N\lambda$ (N: integer= diffraction number, $\lambda$: wavelength, $\theta$: diffraction angle). An individual grating allows an arbitrary diffraction angle $\theta$ required by the condition. But in Embodiment 8, the grating is a built-in grating on a bench. The diffraction angle is limited only to $\theta=90$ degrees. Since beams propagate only in the lightwaveguides, b should be replaced by nb (n: refractive index, b: grating period). Bragg's restriction is reduced to a simple selection rule $nb=N\lambda$ (N: integer=diffraction number). Only a wavelength satisfying $\lambda=nb/N$ is reflected by the planar grating. The grating permits other wavelengths to pass through without loss.

Lightwaveguides (cores) have a higher refractive index which is obtained by doping with germanium (Ge) into the waveguide layers. The silica ($SiO_2$) refractive index can be modulated by irradiating ultraviolet rays. A binary beam interference exposure method induces periodical refractive index increments $\Delta n$ at a pitch b by the interference fringes of the ultraviolet rays on the lightwaveguides by dividing ultraviolet laser beams into two coherent beams, shooting two coherent beams to an object from both sides, making interference fringes with an arbitrary pitch b on the object and perturbing the refractive index by the ultraviolet ray power. Although the change $\Delta n$ of the refractive index is small, reflection power can be enhanced by increasing the number of grating cells. Since the grating is one kind of diffraction elements, wavelength selectivity is to reflect a specified wavelength and to admit other wavelengths to pass. The grating is different from a dielectric bandpass filter which allows only a single wavelength to pass. The gratings should be discerned from dielectric bandpass filters.

Figure 16:
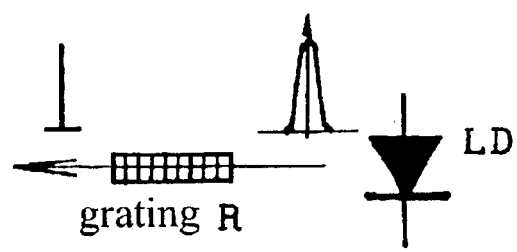
FIG. 16 is an explanatory figure for illustrating the function of a grating in Embodiment 8 having a laser diode and the grating.

The built-in gratings enable the LD module to choose oscillation wavelengths of the laser diodes. In this case, a pair of a grating and a rear mirror of a laser diode forms a resonator. The length of the resonator is prolonged by the built-in grating. The peak of a laser oscillation spectrum is narrowed by the prolonged resonator. FIG. 16 demonstrates a change of spectrum peaks of laser oscillation at a predetermined frequency by the grating R. It is possible to differentiate four grating periods b for varying oscillation frequencies of four laser diodes.

Figure 17:
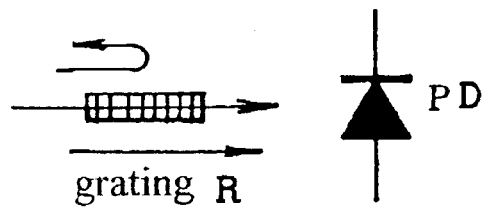
FIG. 17 is an explanatory figure for demonstrating the function of a grating in Embodiment 8 having a photodiode and the grating.

Alternatively, built-in gratings can be applied to PD modules in addition to the LD modules. FIG. 17 demonstrates an example of a PD module with a grating R. When a grating is formed on a lightwaveguide, the grating repulses all unnecessary wavelengths and allows only a necessary signal wavelength to pass and reach the photodiodes (PD). The built-in gratings enable a small-sized photodiode (PD) module to have rigorous wavelength selectivity.

[Embodiment 9 (Polarizer, Isolator, Wavelength Selective Filter, LD/PD Module; FIGS. 18 to 21)]

Figure 18:
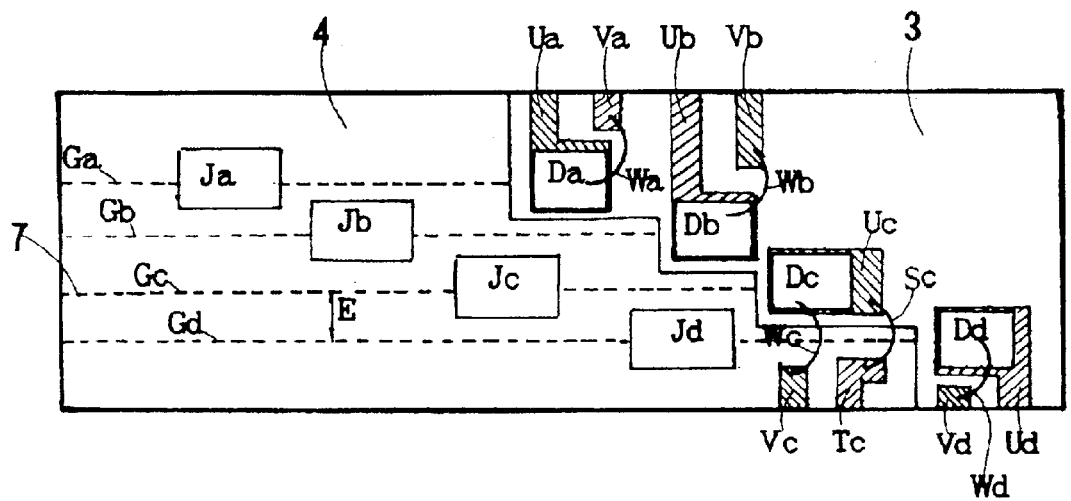
FIG. 18 is a plan view of Embodiment 9 forming four parallel lightwaveguides whose lengths linearly increase from the shortest to the longest in the order with a pitch E equal to the fiber pitch H of a ribbonfiber on a bench, embedding second photoactive devices halfway on the lightwaveguides, mounting four optoelectronic devices (LDs or PDs) on metallized pads at points behind final ends of the length-increasing lightwaveguides on the bench, and connecting metallized patterns to leadpins by wirebonding.

Embodiment 9 is an LD or PD module which includes second photoactive devices Ja, Jb, Jc and Jd which have some functions other than laser diodes or photodiodes. The modules of the present invention have long benches, which is pertinent to mount other photoactive devices on the bench. FIG. 18 is a plan view of Embodiment 9 which adds second photoactive function devices Ja, Jb, Jc and Jd on Ga, Gb, Gc and Gd. The present invention allows only a part of the lightwaveguides to maintain the second photoactive devices.

Figure 19:
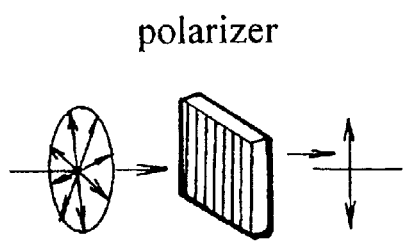
FIG. 19 is an explanatory figure for demonstrating the function of polarizers which are employed in Embodiment 9 as a second photoactive device.

Photoactive devices are, for example, polarizers, isolators, wavelength selective filters and so on. The polarizer is a device for converting circular polarization or elliptical polarization into linear polarization in a determined direction, as shown in FIG. 19. A planar polarizer is accessible. The planar polarizer can be fixed into grooves formed on the bench.

Figure 20:
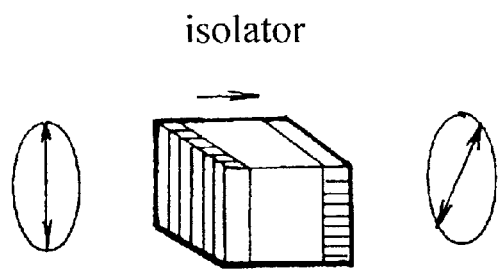
FIG. 20 is an explanatory figure for demonstrating the function of isolators which are employed in Embodiment 9 as a second photoactive device.

The isolator is a complex device consisting of a polarizer, a 45-degree Faraday rotation element and a 45-degree analyzer, as shown in FIG. 20.

Figure 21:
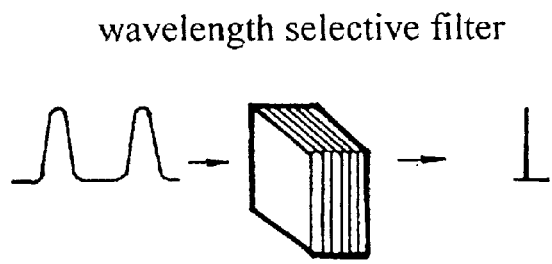
FIG. 21 is an explanatory figure for demonstrating the function of wavelength selective filters which are employed in Embodiment 9 as a second photoactive device.

The wavelength selective filter, which can be made by piling dielectric thin films of different refractive indices, has a function of allowing only a determined wavelength to pass and reflecting other wavelengths, as shown in FIG. 21.

An addition of photoactive devices Ja, Jb, Jc and Jd, for example, polarizers, to the lightwaveguides enables the present invention to make wavelength selective LD modules or PD modules.

Another addition of photoactive devices Ja, Jb, Jc and Jd, for example, isolators, to the lightwaveguides gives the present invention LD modules or PD modules immune from the reflection returning light, which destabilizes the action of laser diodes.

A further addition of photoactive devices Ja, Jb, Jc and Jd, for example, wavelength selective filters, to the lightwaveguides gives the present invention LD modules which excel in monochromacity of oscillation or PD modules which are sensitive only to a determined wavelength.

Embodiment 9 has advantages of not only enlarging widths for laying laser diodes or photodiodes but also widening space W for mounting the second photoactive devices in a range of E<W<2E−d. For example, no isolators of a size less than 250 μm is sold on the market. An isolator includes a polarizer, a Faraday rotator, an analyzer and a permanent magnet. Complexity of components prohibits an isolator from diminishing in size. Current technology allows the smallest cylindrical isolators to take a diameter of slightly less than 500 μm. Embodiment 9 can embed the smallest isolators onto half round grooves formed on the lightwaveguides.

In addition to the second photoactive devices, the present invention allows LD or PD modules to have third or fourth photoactive devices on wide, long lightwaveguides or on rear ends behind the lightwaveguides.

Figure 22:
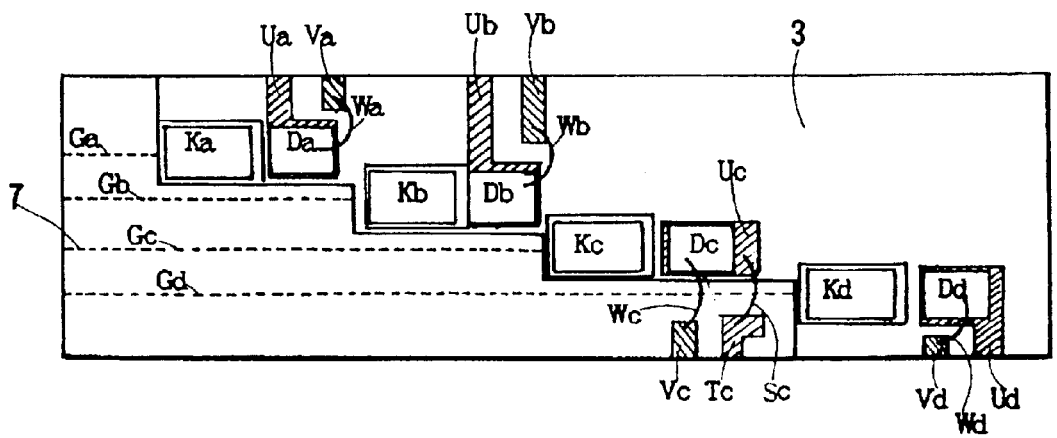
FIG. 22 is a plan view of Embodiment 10 forming four parallel lightwaveguides whose lengths linearly increase from the shortest to the longest in the order with a pitch E equal to the fiber pitch H of a ribbonfiber on a bench, upholstering second photoactive devices behind ends of the length-increasing lightwaveguides, and mounting four optoelectronic devices (LDs or PDs) on metallized pads at points following the second photoactive devices.
Figure 23:
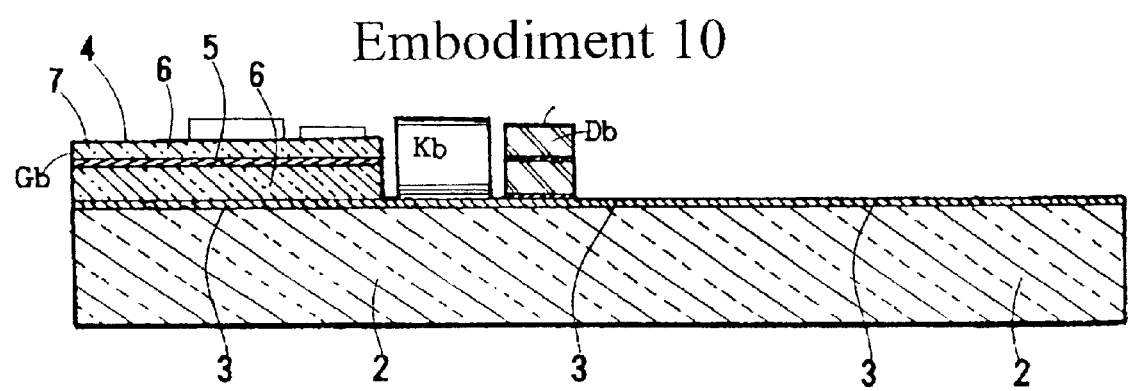
FIG. 23 is a vertically-sectioned side view of Embodiment 10.
Figure 24:
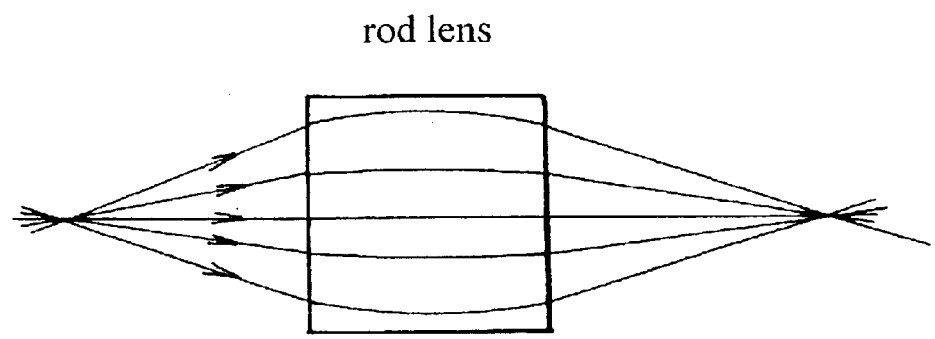
FIG. 24 is an explanatory figure for demonstrating the function of rod lenses which are employed in Embodiment 10 as a second photoactive device.

[Embodiment 10 (Photoactive Devices on Extensions, Multichannel LD or PD Module, FIGS. 22 to 24)]

Embodiment 10 places second photoactive devices on extensions of lightwaveguides just in front of the laser diodes or the photodiodes instead of laying on the lightpaths. Here, the second photoactive devices Ka, Kb, Kc and Kd mean rod lenses, isolators, wavelength selective filters, polarizers and so on.

FIG. 22 is a plan view of Embodiment 10. FIG. 23 is a sectional view. The figures show an example of rod lenses as second photoactive devices. If a PD module is provided with rod lenses before the photodiodes, the rod lenses are effective for converging beams from optical fibers to narrow forefronts of front incidence type photodiodes. Installation of rod lenses is more effective for laser diode modules than for PD modules. If rod lenses are mounted on an LD module, the rod lens converges beams emitted from the laser diode to a final end of the lightwaveguide with high coupling efficiency. An emission part of an LD is a narrow square less than 0.2 $\mu$m×2 $\mu$m. Divergence of an LD beam is large. Without a converging lens, the LD beam fails to go into a narrow lightwaveguide core of a 6 $\mu$m square. The rod lenses are useful to guide and converge the LD beams into the lightwaveguides on the bench. Long space enables the module to install the rod lenses before the laser diodes in Embodiment 10.

FIG. 24 demonstrates action of the rod lens. The rod lens is a cylindrical, transparent optical part with refractive indices changing as a function of a radius r. A rod lens having a higher refractive index at a center and a lower refractive index at a periphery has converging function like a convex lens.

Other second photoactive devices are polarizers (FIG. 19), isolators (FIG. 20), and wavelength selective filters (FIG. 21) in Embodiment 10.

[Embodiment 11 (Modulation, Amplification, Monitoring; FIGS. 25 to 28)]

Aforementioned embodiments are all LD modules or PD modules. However, the present invention can be also applied to other photoactive devices having multichannel lightpaths. A feature of the present invention lies in the disposition of photoactive devices at a variety of positions in the longitudinal direction. Thus, the present invention admits photoactive devices, which are modulator, amplifiers, monitors and so forth, to position at different spots on lightwaveguides.

When intervening photoactive devices are included in a module of Embodiment 11, the lightpaths should stretch on a bench from the front to the back.

Embodiment 11 makes holes or cavities on the lightwaveguides on the bench and embeds the photoactive devices. Multichannel beams propagating in the lightpaths experience the functions of the photoactive devices.

Figure 25:
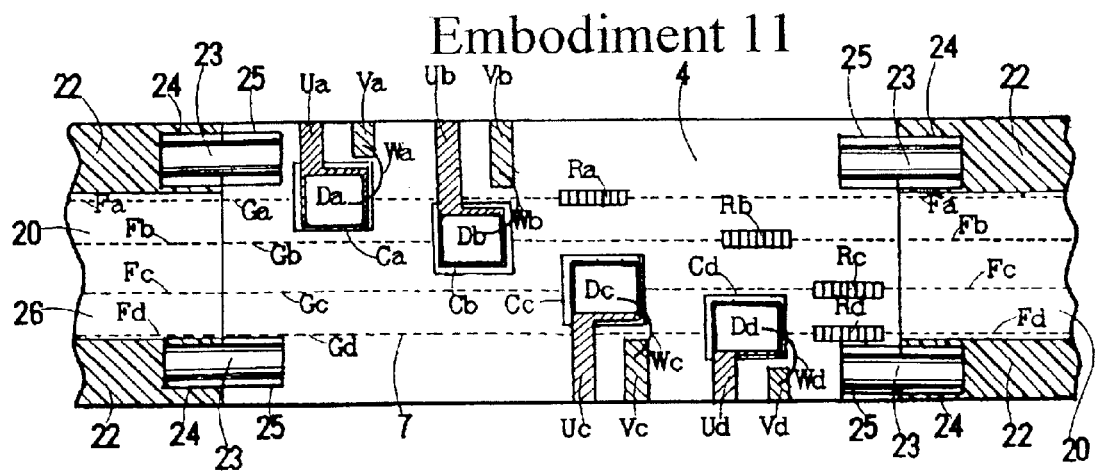
FIG. 25 is a plan view of Embodiment 11 forming four parallel overall lightwaveguides with a pitch E equal to the fiber pitch H of a ribbonfiber on a bench, making gratings halfway on the overall lightwaveguides, mounting four photoactive devices (photomodulators, photoamplifiers, power monitors) on metallized pads formed at cavity points whose distances from the front edge linearly increase halfway on the lightwaveguides and connecting optoelectronic devices to metallizes by wirebonding in a state coupled with a forward connector and a rear connector with guidepins and guideholes.
Figure 26:
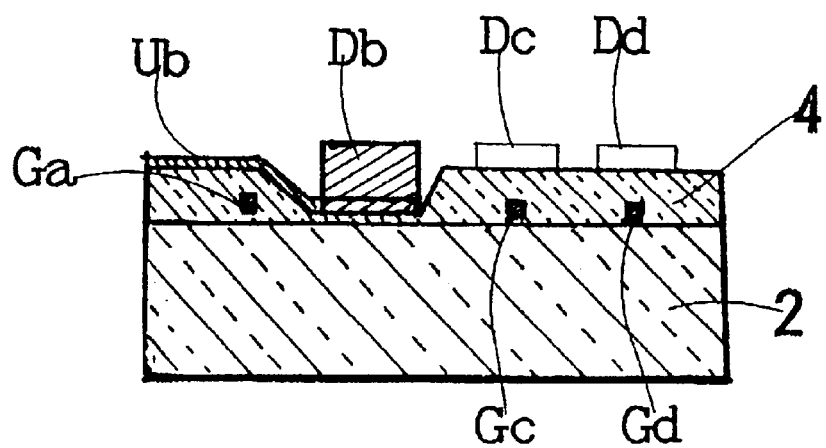
FIG. 26 is a sectional view of Embodiment 11 sectioned along a lateral line crossing Db for showing a photoactive device laid in a cavity for levelling the device with the lightwaveguide.
Figure 27:
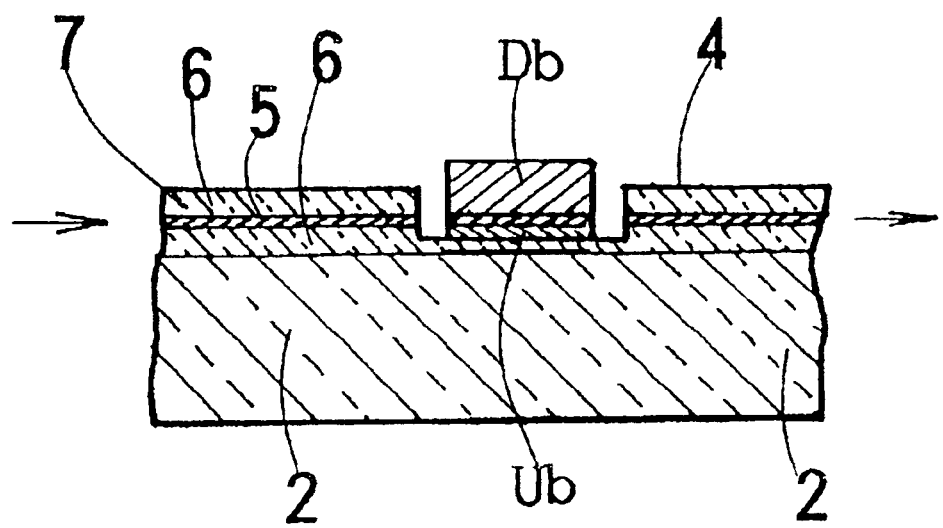
FIG. 27 is a sectional view of Embodiment 11 sectioned along a longitudinal line crossing Db for showing a photoactive device laid in a cavity for levelling the device with the lightwaveguide.

FIG. 25 is a plan view of Embodiment 11. FIG. 26 is a sectional view cut on a lateral line crossing Db. FIG. 27 is a sectional view cut a longitudinal line crossing Db. Holes Ca, Cb, Cc and Cd are perforated halfway at different lengths on the lightwaveguides Ga, Gb, Gc and Gd. Metallized patterns Ua-Ud and Va-Vd are prepared on the bench for wiring the optoelectronic devices with leadpins. Since positions of the holes are different in the longitudinal direction, enough space for boring holes are secured. Embodiment 12 provides the holes Ca, Cb, Cc and Cd with optoelectronic devices Da, Db, Dc and Dd. As shown in FIGS. 26 and 27, boring of holes enables the heights of active layers of Da, Db, Dc and Dd to be on a level with the lightwaveguides.

Two four-channel ribbonfibers 20 and 20 are connected at the front and at the back of Embodiment 11 by MT connectors 22 and 22. The MT connectors 22 maintain ends of the ribbonfibers 20. The module has guidepins 23. The MT connectors have guideholes 24. The MT connectors can be attached to or detached from the module by action of guidepins and guideholes. Allocation of guidepins and guideholes to a module or a connector is optional. When the photoactive devices Da, Db, Dc and Dd are modulators, semiconductor modulators or dielectric modulators (LiNbO$_3$) are available. Light beams modulated by the modulators Da, Db, Dc and Dd go out of the module from the final ends of Ga, Gb, Gc and Gd.

Figure 28:
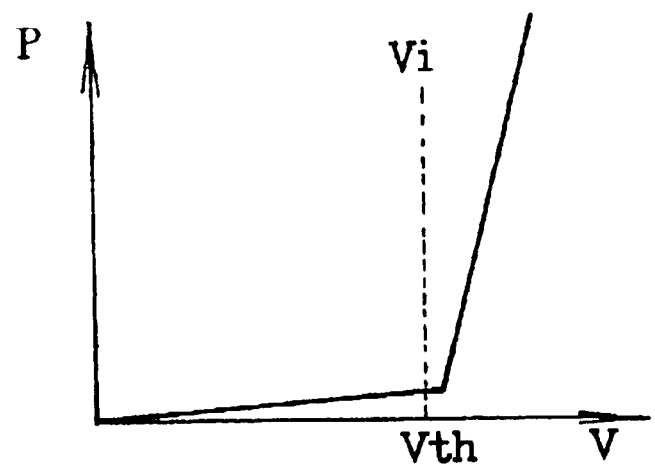
FIG. 28 is an explanatory figure for demonstrating the function of photoamplifiers which are employed in Embodiment 11 as a photoactive device.

When the photoactive devices Da, Db, Dc and Dd are photoamplifiers, the module can amplify incidence beams propagating from the front ends and emit amplified beams from the rear ends. As shown in FIG. 28, a photoamplifier is prepared by biasing a laser diode at a positive voltage Vi slightly below the threshold voltage Vth. An additional incident beam into the laser diode makes a stronger beam by action of the positive bias. Another photoamplifier based upon different actions is also available.

Other candidates for the photoactive devices Da, Db, Dc and Dd are photodiodes for monitoring light power of propagating in the lightpaths. Front incidence type photodiodes are suitable for monitoring photodiodes. The monitoring photodiodes absorb a part of propagating light beams and allow the rest to pass therethrough. The module having a set of monitoring photodiodes should be interposed midway in a ribbonfiber for checking power of propagating signal beams.

Besides the photoactive devices, fiber gratings Ra, Rb, Rc and Rd can be interposed into lightpaths for excluding unnecessary wavelengths and selecting necessary wavelengths for the following optical circuits. The fiber gratings can cooperate with photomodulators, photoamplifiers and wavelength selective filters formed on the same lightpaths. The grating, which reflects a predetermined wavelength, heightens the selective function of the wavelength selective filter which admits another wavelength to pass.

The long lightpaths allow to add extra useful functions to the module. Addition of other functions makes complex photoactive modules having a size equal to the size of prevalent surface mountable modules.

Figure 29:
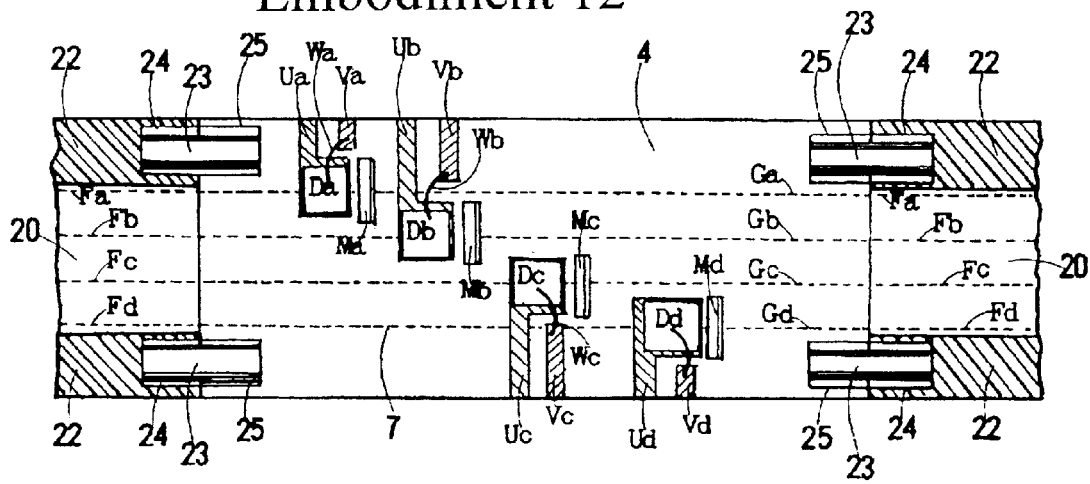
FIG. 29 is a plan view of Embodiment 12 forming four parallel overall lightwaveguides with a pitch E equal to the fiber pitch H of a ribbonfiber on a bench, mounting four bottom incidence type photodiodes on metallized pads formed at points whose distances from the front edge linearly increase halfway on the lightwaveguides, installing wavelength selective filters facing slantingly upward behind the bottom incidence type photodiodes and connecting optoelectronic devices to metallizes by wirebonding.
Figure 30:
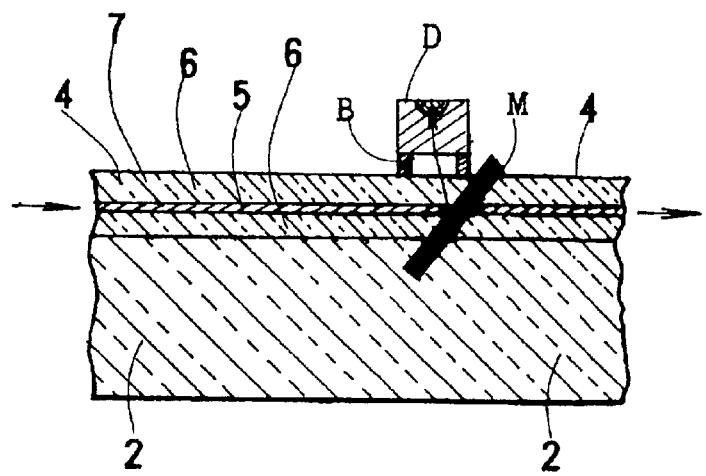
FIG. 30 is a vertically-sectioned view of a part of Embodiment 12 for exhibiting a receiving signal beam being reflected by a wavelength selective filter upward into a photodiode.

[Embodiment 12 (Inline-Monitor, Bottom Incidence Type PD; FIGS. 29 and 30)]

Embodiment 11 describes an inline-monitor having a front incidence type photodiode which absorbs a part of light and admits the rest to pass. The front incident PD causes large loss of power. Embodiment 11 proposed the low-loss inline-monitor based upon bottom incidence type photodiodes.

Embodiment 7 reflects all the power and detects all the power by the bottom incidence type photodiodes. Otherwise, Embodiment 12 reflects and absorbs a part of light power propagating in the lightpaths.

FIG. 29 is a plan view of the inline-monitor. FIG. 30 is a sectional view of the same. Lightwaveguides Ga, Gb, Gc and Gd have bottom incidence type photodiodes Da, Db, Dc and Dd mounted upon submounts B aligning in a slanting direction for avoiding mutual collisions.

There are four allowable positions (n=4) on the lightpaths in the longitudinal direction. 108 sets of arrangements are possible. FIG. 29 shows only one set. Slanting partial mirrors Ma, Mb, Mc and Md are disposed just behind the submounts and the photodiodes. A part (5% to 10%) of propagating light is reflected by the partial mirrors slantingly upward. Reflected beams go via holes of the submounts B, enter bottoms of the photodiodes and induce photocurrent. The rest of the light passes the mirrors, propagates in the lightpaths, passes the MT connector and arrives at element fibers in a ribbonfiber. The inline-monitor has advantages of high sensitivity, low interchannel crosstalk and facile alignment.

What we claim is:

1. a multichannel optical communications module comprising:
    a bench;
    m parallel linear lightpaths being produced upon the bench, having a width d, having a length which is equal to one of n different lengths but is different from lengths of neighboring lightpaths and aligning in parallel with a pitch E which is equal to a pitch of multichannel element fibers; and m optoelectronic device chips having a width W satisfying an inequality of $E<W<2E-d$ and being installed behind rear ends of the parallel lightpaths on the bench.

2. The multichannel optical communications module according to claim 1, wherein the m optoelectronic device chips installed behind the ends of the lightpaths are laser diode chips or front incidence type photodiode chips.

3. The multichannel optical communications module according to claim 2, wherein the bench is a silicon bench.

4. The multichannel optical communications module according to claim 3, further comprising guidepins or guideholes for attaching to or detaching from an outer connector holding an m-channel ribbonfiber.

5. The multichannel optical communications module according to claim 4, further comprising a leadframe which is fitted on a bottom of the bench.

6. The multichannel optical communications module according to claim 5, further comprising a plastic package which is made by transfermolding the bench and the leadframe with a resin in a metallic mould.

7. The multichannel optical communications module according to claim 4, further comprising m gratings interposed on the lightpaths for reflecting a predetermined wavelength.

8. The multichannel optical communications module according to claim 4, further comprising m polarizers, isolators or wavelength selective filters lying in holes perforated on the lightpaths and allowing light beams to pass through.

* * * * *